United States Patent
Aamodt et al.

(10) Patent No.: US 7,458,031 B2
(45) Date of Patent: Nov. 25, 2008

(54) SYSTEM AND METHOD FOR CREATING CUSTOMIZABLE NODES IN A NETWORK DIAGRAM

(75) Inventors: Jeffrey R. Aamodt, Sammamish, WA (US); Alexander A. Sourov, Seattle, WA (US); Darius Snapkauskas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 10/826,010

(22) Filed: Apr. 16, 2004

(65) Prior Publication Data

US 2004/0196310 A1 Oct. 7, 2004

Related U.S. Application Data

(62) Division of application No. 09/703,748, filed on Nov. 1, 2000.

(51) Int. Cl.
*G06F 3/048* (2006.01)
(52) U.S. Cl. .................................. 715/765; 715/801
(58) Field of Classification Search ......... 715/758–760, 715/762, 734, 765, 767, 801, 854
See application file for complete search history.

(56) References Cited

U.S. PATENT DOCUMENTS

| | | | |
|---|---|---|---|
| 5,414,809 A | 5/1995 | Hogan et al. | |
| 5,563,994 A | 10/1996 | Harmon et al. | |
| 5,680,530 A | 10/1997 | Selfridge et al. | |
| 5,704,028 A | 12/1997 | Schanel et al. | |
| 5,754,873 A * | 5/1998 | Nolan | 715/527 |
| 5,969,706 A * | 10/1999 | Tanimoto et al. | 345/671 |
| 5,973,694 A * | 10/1999 | Steele et al. | 715/835 |
| 5,982,383 A | 11/1999 | Kumar et al. | |
| 6,252,596 B1 * | 6/2001 | Garland | 715/810 |
| 6,426,761 B1 * | 7/2002 | Kanevsky et al. | 715/788 |
| 6,437,758 B1 * | 8/2002 | Nielsen et al. | 345/8 |
| 6,570,567 B1 | 5/2003 | Eaton | |
| 6,594,696 B1 * | 7/2003 | Walker et al. | 709/223 |
| 6,621,509 B1 * | 9/2003 | Eiref et al. | 715/836 |
| 6,704,034 B1 * | 3/2004 | Rodriguez et al. | 715/860 |
| 6,731,309 B1 | 5/2004 | Unbedacht et al. | |

OTHER PUBLICATIONS

Pyron, Tim, "Special Edition Using Microsoft Project 98." 1997, Que Corporation, pp. 1-12, 27-59, 91-169, 215-248, 695-740.

* cited by examiner

*Primary Examiner*—Thanh T Vu
(74) *Attorney, Agent, or Firm*—Perkins Coie, LLP

(57) ABSTRACT

The present invention permits customization of shapes, sizes, and layout for data of nodes within a network diagram based upon node category or nodes selected by the user. The invention also permits a user to create his or her own data template for the layout of data within a certain category of nodes. The invention further provides a filter that highlights nodes in a network diagram according to parameters selected by a user. The invention can include a graphical user interface that permits rapid and easy selection of various options for nodes displayed within a network diagram. The system and method of the present invention also organizes and generates a network diagram that permits a user to display one or more nodes at one magnification level while displaying other nodes at a different magnification level.

8 Claims, 15 Drawing Sheets

SYSTEM AND METHOD FOR CREATING CUSTOMIZABLE NODES IN A NETWORK DIAGRAM

CROSS REFERENCE TO RELATED APPLICATION

This application is related to U.S. patent application Ser. No. 09/703,756, filed Nov. 1, 2000, entitled "System and Method for Creating a Customizable Network Diagram."This application is a divisional of and claims priority to U.S. application Ser. No. 09/703,748, filed Nov. 1, 2000, entitled "System and Method for Creating Customizable Nodes in a Network Diagram," the entire contents of which are incorporated by reference.

TECHNICAL FIELD

The present invention relates to computer systems for generating charts and graphs. More particularly, the present invention relates to computer systems that create network diagrams comprising nodes that can be customizable by a user.

BACKGROUND OF THE INVENTION

Many conventional project planning software applications provide multiple chart formats for project scheduling data. However, the conventional project planning software applications do not typically permit customization of the elements that define a work chart.

For example, the simplest scheduling tool is the bar or Gantt chart. In this conventional format, work activities or tasks are listed in a vertical direction while elapsed time for each work activity or task is recorded horizontally. While this chart format clearly shows the date by which an activity should start and finish, this format does not make clear how the ability to start one activity depends upon the successful completion of other activities. Further, usually Gantt charts are very plain where each work activity has the same graphical layout. With such a display, it is difficult to distinguish important work activities from non-important work activities. In other words, the conventional Gantt chart without customization capabilities does not permit, for example, the differentiation between work tasks that could be categorized as critical relative to work tasks that could be categorized as non-critical.

Conventional project planning software typically does not permit the customization of shapes or sizes of individual nodes that may represent tasks or work activities of a project. That is, the conventional art does not provide a mechanism in which the user can select specific shapes, colors, or formats of the data contained within the shapes for individual nodes that represent work tasks.

In addition to the lack of customization for nodes of a work chart, conventional project planning software usually does not provide any mechanism in which to filter nodes that represent work tasks that match specific criteria. Stated differently, conventional project planning software does not permit a user to customize a work flow diagram based upon how a node is categorized. Further, conventional project planning software does not provide any mechanism which is used in conjunction with a filter to highlight nodes of a specific category so that a user can track such nodes in complex work charts that may comprise numerous nodes.

Also, conventional project planning software does not typically permit the user to select one or more nodes to be customized irrespective of their category. That is, conventional project planning software does not typically permit a user to highlight one or more nodes so that a user can customize the nodes that are highlighted by the user. The conventional project planning software further fails to provide any mechanism for customizing the layout of data contained within the graphical structures that define the physical characteristics of a node. In other words, the conventional art typically does not permit customization of how data is displayed within individual nodes where multiple node configurations are displayed in a particular network diagram.

In addition to the lack of node customization in conventional project planning software, such software typically does not adjust sizes of nodes within a display to make sure that node and data is visible to the user. In other words, in order to view several groups of nodes in a work chart, a user may scale the view so that nodes are displayed at a reduced size. However, when the nodes are displayed at a reduced size, the corresponding data is also reduced in size so that sometimes the node data is not readily visible to a user. In order for the user to see the node data of individual nodes, the user must enlarge or change the size of the whole diagram so that the node data can be enlarged to a size that is visible to the user. However, when switching between enlarging and decreasing the size of a work chart diagram, the user typically cannot readily track the interrelationships between the plurality of nodes that make up a work chart.

Accordingly, there is a need in the art for a system and method for organizing and generating a network diagram that permits the user to display one or more nodes at one magnification level while displaying other nodes at a different magnification level. There is a further need in the art for generating a network diagram that permits customization of shapes, sizes, and layout for data of nodes based upon node category or nodes selected by the user. A further need in the art exists for a system and method that permits the user to create his or her own data template for the layout of data within a certain category of nodes. Another need exists in the art for a filter that is designed to highlight nodes in a network diagram according to parameters selected by a user. Additionally, there is a need in the art for a system and method that generates a graphical user interface that permits rapid and easy selection of various options for nodes displayed within a network diagram.

SUMMARY OF THE INVENTION

The present invention is generally directed to a graphical user interface that permits selection of various options for nodes displayed within a network diagram. Nodes are graphical items that can be displayed on an appropriate output device, such as a screen display. The nodes can have established or predetermined relationships, called dependencies, between each other. That is, each node can be assigned a defined relationship, represented by lines called links, relative to another node. For example, a first node could represent the first task or job in a work project while a second node could represent a second task or job that can only be started upon completion of the first task. In this exemplary scenario, the second node would be called a successor of the first node. Because of the second node's dependency, the second node's position relative to the first node would usually be placed on the right side of the first node.

Alternatively, the first node could represent a summary task and the second node could represent a first subtask of one or more subtasks to a job or mini-project that requires many steps. Similar to the previous task completion dependency scenario, the second node's position in this summary task/subtask scenario would be placed on the right side of the first node.

Because of the dependencies between nodes, the present invention could be characterized as similar to conventional program modules that produce Program Evaluation and Review Technique (PERT) Charts. However, conventional PERT Chart program modules typically do not permit the filtering of nodes or displaying certain nodes based upon preset criteria. With the conventional art, usually the size, shape, and color of nodes are fixed and cannot be changed. Also, the conventional art typically does not permit individual node formatting.

In contrast to the conventional art, the options for the nodes mentioned above can be managed by two separate dialog boxes: (1) a 'Box Style' dialog box and (2) a 'Data Template' dialog box. As the name of the 'Box Style' dialog box implies, this dialog box can provide an interface for selecting options for borders that form one or more nodes. Such border options can include, but are not limited to, border shape, color, and width. In addition to border options, the 'Box Style' dialog box can provide an interface for selecting background options for one or more nodes. The background options can include, but are not limited to, the color of the border and the fill pattern of the space enclosed by the border.

Another option in the 'Box Style' dialog box can be where a data template can be associated with a category. Accordingly, not only are data templates customizable, they can be also treated as just another formatting property of a node category, which allows data within the node to dynamically change as the category of the node changes (or when highlight filtering is activated, as discussed below).

The 'Box Style' dialog box can also provide an interface for selecting options of nodes based upon categories of nodes. In other words, a network diagram can have one or more categories of nodes that can be displayed simultaneously. The 'Box Style' dialog box permits the assignment of options to one or more categories of nodes. For example, a user can assign nodes categorized as "critical" with a particular set of options that can be selected within the 'Box Style' dialog box. For nodes categorized as "noncritical," the user can select different node options compared to the "critical" nodes. The 'Box Style' dialog box can also display a preview of a node with the selected options. The 'Box Style' dialog box can further display a preview of a specific node within a network diagram.

Similar to the 'Box Style' dialog box, the 'Data Template' dialog box provides an interface to additional formatting options for one or more nodes of a network diagram. With this dialog box, one or more pre-existing data templates that define how data is displayed within a respective node can be selected. Alternatively, a new data template can be created by a user without relying on any of the pre-existing templates. Additionally, pre-existing templates can also be imported with this dialog box.

Data templates are usually a rectangular grid of cells that are used to display data that is inputted for a network diagram. The 'Data Template' dialog box can also provide a preview of a selected data template. This dialog box can permit customization or modification of the pre-existing data templates. When modification of a data template is desired, another dialog box can be activated, such as a 'Data Template Definition' dialog box.

The 'Data Template Definition' dialog box can display the name of the template being modified as well as the current preview of the template. The preview can also display a cell layout for a particular node. This dialog box permits a user to assign specific data variables to each cell within a data template. Further, this dialog box permits customization of a multitude of cell parameters. Such cell parameters include, but are not limited to, font of text, horizontal alignment of data within a cell, vertical alignment of data within a cell, activation of labels within a cell, the number of lines within a cell, and date formats (if any) within a cell. When modification of the number of cells within a data template is desired, another dialog box can be activated, such as a 'Cell Layout' dialog box.

The 'Cell Layout' dialog box can provide an interface for the selection of the number of rows and columns within for a cell layout of a particular data template. The 'Cell Layout' dialog box can further provide a selection for customizing cell width and how blank cells are displayed within a node.

According to another aspect of the invention, the 'Box Style' dialog box can also permit the selection of options for a highlight filter. In other words, a user can select a highlight style that can distinguish a set of nodes from other nodes in a network diagram. This highlight style can be merged with a node's regular category style settings to create merged formatting settings that are applied to nodes of a category that are designated to be highlighted. The "merging" of formatting settings in one embodiment can occur when highlight filter settings (that have a value) override the respective category settings. The result is that "highlighting" of nodes allows filter-matching nodes to be displayed with a certain set of similar characteristics. And the more highlight filter formatting options that have a value specified, the more alike the highlighted nodes from different categories will appear. When the highlight filter option in the 'Box Style' dialog box has been selected, a preview of the merged settings of the highlight filter formatting and a selected node category's formatting can be displayed.

For another aspect of the present invention, a node popup feature can be used to display data within a large diagram or when data for nodes is displayed at a reduced size. For example, a network diagram may comprise a large number of nodes. In order to fit many nodes within a single screen display, each node may be scaled in size. When a node is scaled, the text data may be reduced beyond comprehension or the text data may not be displayed. With the node popup feature, a selected node or a region of nodes may be magnified or displayed to a user at a size that is comprehendible by the user. The node popup feature can be linked to mouse pointer movement such that only nodes adjacent to the pointer will be transformed with the node popup feature.

DETAILED DESCRIPTION OF EXEMPLARY EMBODIMENTS

Figure 1:
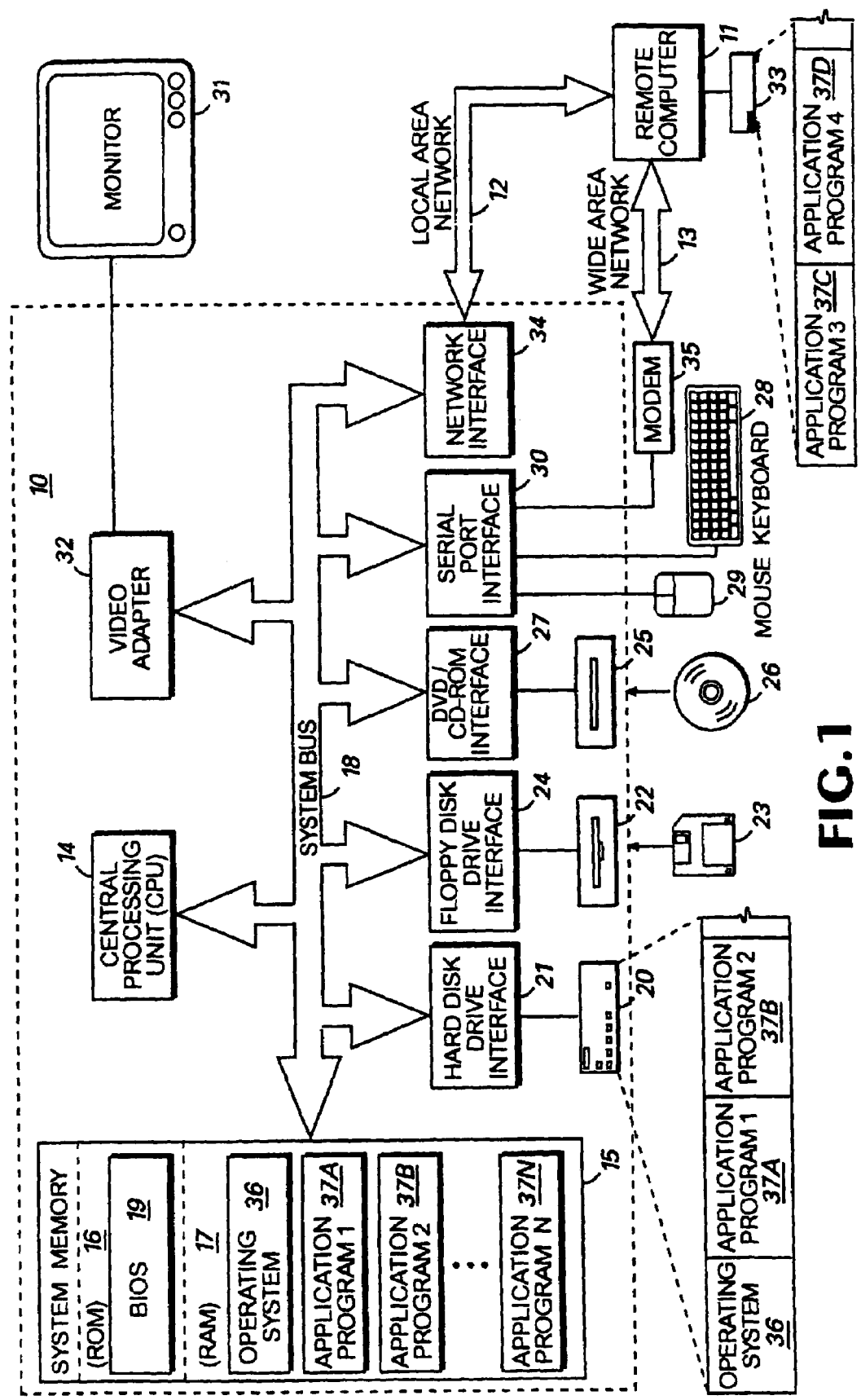
FIG. 1 is a block diagram of a network personal computer that provides the exemplary operating environment for the present invention.

The system and method of the present invention organizes and generates a network diagram that permits the user to display one or more nodes at one magnification level while displaying other nodes at a different magnification level. The present invention further permits customization of shapes, sizes, and layout for data of nodes based upon node category or nodes selected by the user. The invention also provides a vehicle that permits a user to create his or her own data template for the layout of data within certain nodes. The invention further provides a formatting mechanism that is applied based on filtering that highlights nodes in a network diagram according to formatting parameters selected by a user. The invention can include a graphical user interface that permits rapid and easy selection of various formatting options for nodes displayed within a network diagram.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM OR DVD drive 25, which is used to read a CD-ROM OR DVD disk 26, is connected to the system bus 18 via a CD-ROM OR DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM OR DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the preferred computer, the computer-readable media include the local or remote memory storage devices, which may include the local hard disk drive 20, floppy disk 23, CD-ROM OR DVD 26, RAM 17, ROM 16, and the remote memory storage device 33. In the preferred personal computer 10, the local hard disk drive 20 is used to store data and programs, including the operating system and programs.

Figure 2:
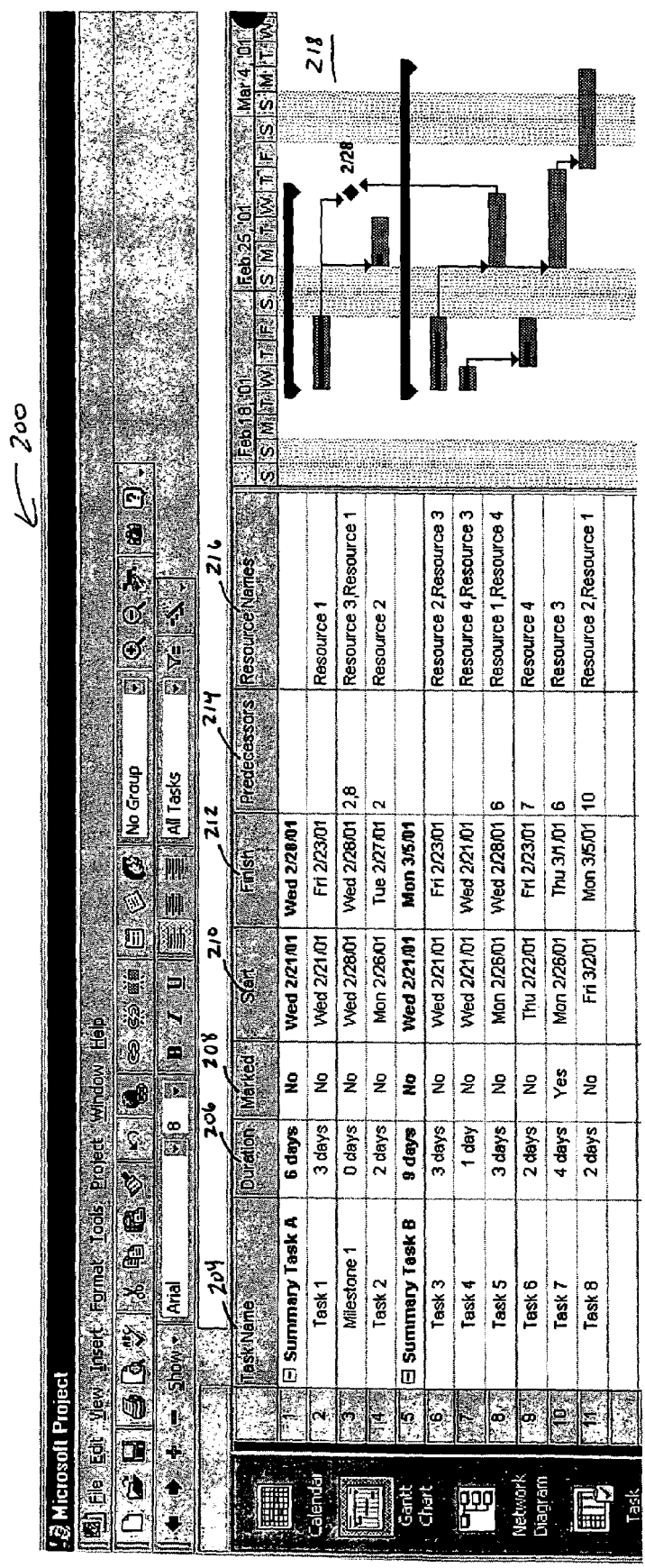
FIG. 2 illustrates a table of project data that can be manipulated by the present invention.

Referring now to FIG. 2, an exemplary display screen 200 of the present invention is illustrated. Project data or table 202$_{[J41]}$ that will be used to create a network diagram 302A (discussed below with respect to FIG. 3) is presented in a chart format. The project data 202 comprises columns of data that are labeled as follows: task name 204, duration 206, marked 208, start 210, finish 212, predecessors 214, and resource names 216. The data present in the task name column 204 can be defined by a user. Similarly, the project data present in the duration column 206 and the remaining columns can all be defined by a user. The present invention is not limited to the type and number of columns shown. Those skilled in the art will appreciate that other columns can be generated in order to classify or categorize the project data for a network diagram.

The data in the predecessor column 214 identifies the relationships between the plurality of work activities for an entire project. For example, task 2 has a duration of two days and it has a predecessor of task 1 which means that task 2 can only be started upon the completion of task 1. Therefore, task 1 can be considered a predecessor node that must occur or be completed before the dependent task 2. Similarly, for task 5, this task has a duration of three days and has a predecessor task 3. Therefore, task 3 is a predecessor task to task 5 and must be completed or must occur before task 5.

Other relationships exist between nodes in a network diagram. For example, the present invention further provides organizational mechanisms for groups of nodes. According to the present invention, "summary nodes" or "summary tasks" define tasks that represent a consolidation of one or more subordinate tasks. A summary task or node can be characterized as a roll-up of the subtasks and as the next level up in an outline level (e.g., subtasks at outline level 3 would be under a summary task at outline level 2). Summary nodes typically do not have a direct dependency relationship with subtasks. In other words, since a summary node is a roll-up of its subtasks, it typically does not have a direct chronological relationship with its subtasks. And therefore, links (discussed below) usually do not exist between subtasks and their respective summary nodes.

Also illustrated in FIG. 2 is a Gantt Chart 218 that corresponds to the project data present in project table 202. Most Gantt Charts 218 do not provide any mechanism to customize individual nodes that form the Gantt chart. That is, each node in a particular category can have a similar color and shape relative to other nodes that form the chart. There is no differentiation in the graphical structure of the nodes to delineate critical tasks from non-critical tasks or other categories of tasks.

Figure 3:
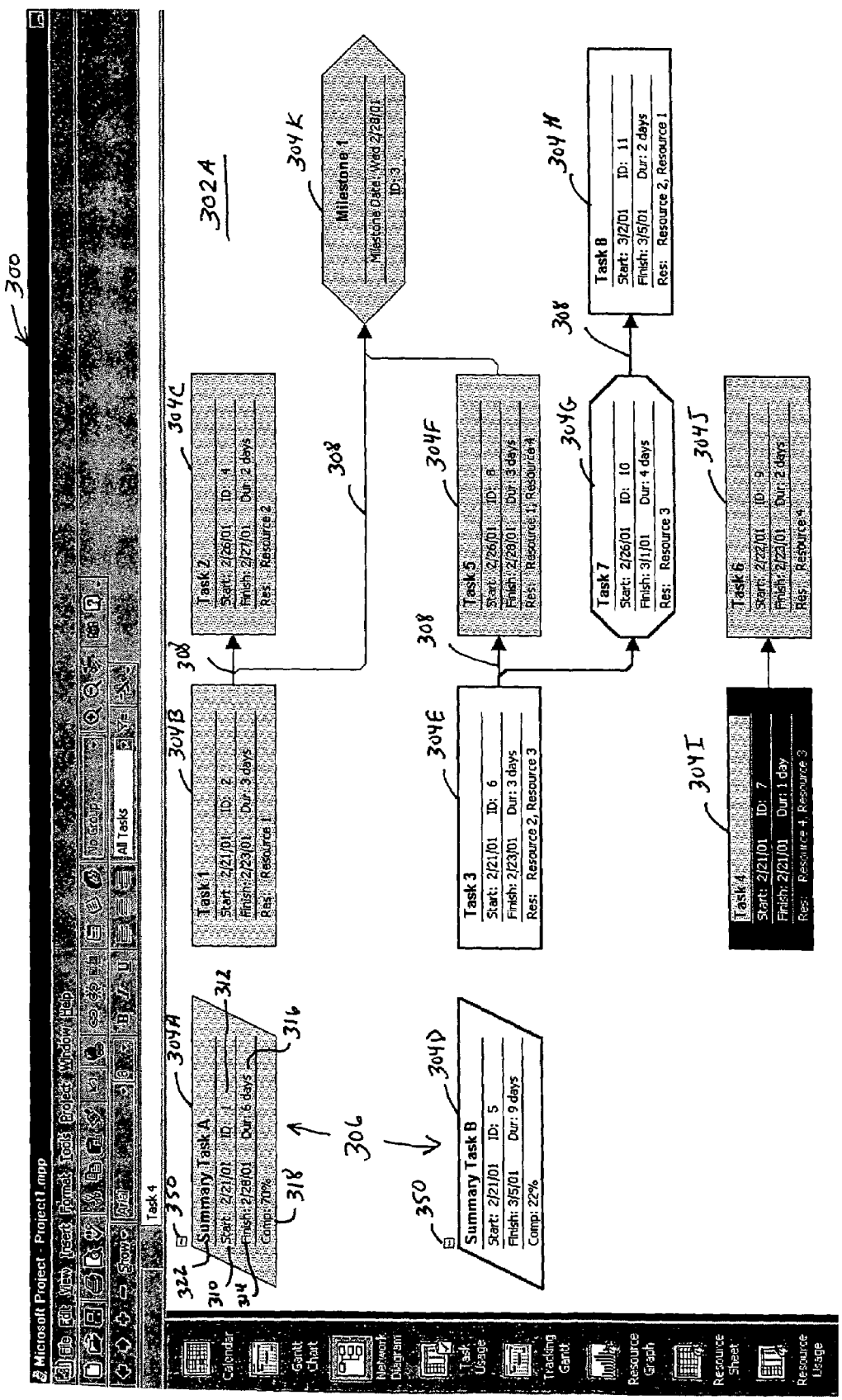
FIG. 3 is an exemplary network diagram for the project data of FIG. 2 according to the present invention.

FIG. 3 illustrates a display screen 300 that contains an exemplary network diagram 302A according to the present invention. Within the exemplary network diagram 302A, there are two node chains 306 that include a plurality of all nodes 304A-304K. Each node chain 306 comprises a summary node that begins the chain, such as summary node 304A or summary node 304D. Each node chain 306 further comprises child or dependent nodes 304B, 304C, and 304K (for the chain beginning with summary node 304A) and 304E-304J (for the chain beginning with summary node 304D).

In this exemplary network diagram 302A, node 304A is a summary task. Since node 304A is a summary task, an indicator 350 is disposed adjacent to summary task A. Indicator 350 can be any type of indicator such as a box with a minus sign exposed in the middle portion thereof. FIG. 3 illustrates an expanded view of the network diagram 302A where both the summary task A and its corresponding subtasks task 1, task 2, and milestone 1 are displayed. In a collapsed view, task 1, task 2, and milestone 1 will not be displayed. In order to render a collapsed view of the exemplary network diagram 302A, the mouse pointer could be used to activate the screen indicator 350. As mentioned above, when the screen indicator/collapse-expand indicator 350 is activated, the detailed task originating from a summary task will either be displayed or hidden from view.

Between each individual node 304, there can be a link 308. However, it is noted that it is possible to display individual nodes 304 without providing links 308 there between. The exemplary network diagram 302A corresponds directly with the relationships identified in table 202$_{[J44]}$ set forth in FIG. 2.

For example, task 1 (node 304B) has a successor task of task 2 (node 304C). Task 2 (node 304C) has a successor task of Milestone 1 (node 304K). Nodes 304B, 304C, and 304K are subtasks of summary node 304A, but they are not successors of 304A. Likewise, nodes 304E-304J are subtasks of 304D, but they are not actual successors of 304D. Therefore, there are no links 308 present between summary nodes 304A, 304D and their respective subtasks. The exemplary network diagram 302A illustrates these relationships between nodes as defined in table 202 of FIG. 2 in a graphical manner.

Each node 304 has data that is displayed according to predefined templates that can be selected by a user. In a scenario where a user does not select the data templates for the data contained within nodes, the invention utilizes default templates to display the data. For example, in node 304A, the task name field 322$_{[J45]}$ shows a name of "Summary Task A." For the start date field 310, there is a start date of "02/21/01." The start date field 310 can be changed by the user and if it is not selected by a user, the invention automatically selects an appropriate date that can be either the present date of data entry or a date based upon relationships with other nodes within the network diagram. The identification field 312 contains the value 1. The finish date field 314 shows a date of "02/28/01." The duration field 316 shows a duration of "6 days." The completion field 318 shows a percentage completion value for its node chain of "70%."

All of the aforementioned data fields correspond directly with the data set forth in table 202 of FIG. 2. The present invention is not limited to the aforementioned fields for each node 304 and can include other fields that are predefined by the present invention and can be selected by the user in a menu option format. Alternatively, the fields contained within each node 304 can be defined by the user.

In FIG. 3, node 304I is shaded differently relative to the other nodes 304 and the exemplary network diagram 302A since node 304I is the current location that has the focus. In other words, node 304I is a selected node to indicate to a user that data contained therein can be manipulated if desired by the user. If the user moves a mouse pointer in an upward direction over node 304E and clicks, or if the user presses an up arrow key, node 304E would then be selected or shaded differently relative to the remaining nodes 304 contained within the exemplary network diagram 302A. Depending upon input received from the user, multiple nodes can be selected at one time. In such a scenario, the selected nodes would be shaded differently relative to the other un-selected nodes.

Figure 4:
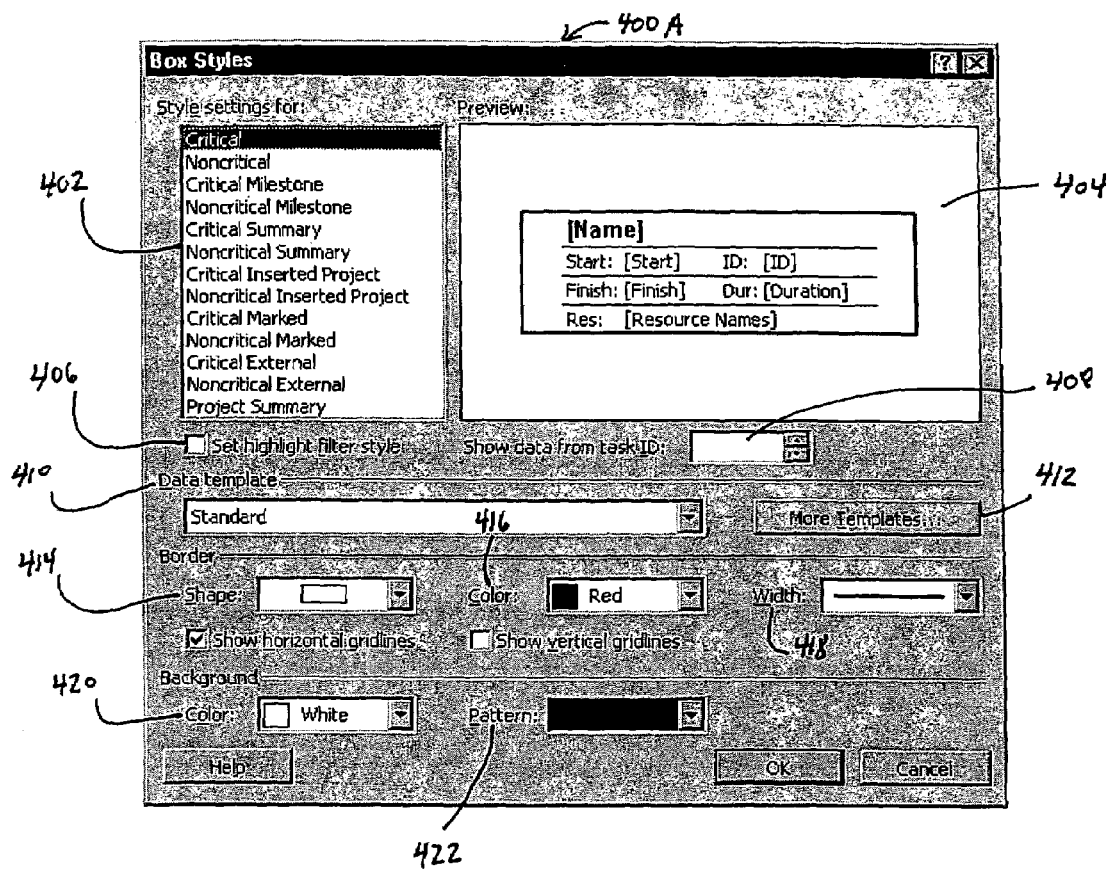
FIG. 4 illustrates an exemplary Dialog box for customizing nodes of a network diagram by category.

Referring now to the FIG. 4, an exemplary Dialog box 400A according to the present invention is illustrated. Exemplary Dialog box 400A is generated when a user desires to change node formatting by category. That is, exemplary Dialog box 400A is produced when a user wants to change the physical characteristics or data layout or both for a particular category of nodes. As mentioned above, nodes 304 of FIG. 3 can be categorized according to the data as set forth in table 202 of FIG. 2. The present invention permits the user to add or delete columns that identify properties of nodes. For example, referring back now to FIG. 2, the marked column 208 designates nodes or tasks as being either marked or not marked. For example, task 7 has been categorized as a marked task, as evidenced by the "yes" value in the marked column of table 202. All other tasks have been categorized as not marked since the inquiry to the critical marked column 208 is "no." Also mentioned above, the present invention is not limited to the categories or columns set forth in FIG. 2. Other columns or categories can be added or deleted by a user depending upon the particular need for the work project or network diagram.

Dialog box 400A provides various options that can be selected by the user. Box 400A can include any one of the following fields: a category menu 402, a preview field 404, a highlight filter indicator field 406, a task ID selection field 408, a data template selection field 410, an additional templates button 412, a border shape drop-down menu 414, a border color drop-down menu 416, a border width drop-down menu 418, a background color drop-down menu 420, and a background pattern drop-down menu 422. Those skilled in the art will appreciate that the present invention is not limited to the number of types of fields illustrated in exemplary Dialog box 400A.

Further, those skilled in the art will also realize that the presentation and selection mechanisms are not limited to those shown. For example, instead of a drop-down menu for the border shape field 414, a list such as category menu list 402 could be generated for a user to select therefrom. Similarly, other fields could include a line pattern field where a user could select from the type of lines that would form the border for a particular node. That is, with such a border line field, a user could select dotted, dashed, or any combination of line segments to form a particular border or shape.

The category menu or category list 402 enumerates the various predefined categories of nodes that can be present in a project. A user can select a particular category of nodes with a mouse pointer or arrow keys of a keyboard to highlight the category of nodes that a user desires to customize. For example, in exemplary Dialog box 400A, the category "critical" is highlighted. This means that any selection or customization of the data templates, border, or background will reflect how the "critical" category of nodes will be displayed within the exemplary network diagram 302A. As the user selects from the various options available, the preview field 404 will illustrate what changes or customization will look like in the exemplary network diagram 302A.

With the highlight filter field 406, a user can activate this field in order to activate highlight filter mode. That is, activating highlight filter field 406 informs the user that when highlight filtering is activated for a network diagram, filtered nodes will have the highlighted style formatting options that are selected by a user with the options set forth in Dialog box 400A. Further details of the highlight filter field 406 will be discussed below with respect to FIG. 9.

The task ID field 408 permits a user to preview data for a particular node. That is, this field allows a user to select data that will be shown in the preview field 404 discussed above. And if no value is entered in the Task ID field, the preview uses placeholder text in place of actual data. The data template field 410 permits the user to select the layout for data that will be contained within a particular category of nodes. The data template or template selection field 410 can comprise a drop-down menu where the user can select from various predefined data templates. Alternatively, the user can create, modify, delete, or import other templates (not shown) by activating the 'More Templates' field or button 412. The additional field or button 412 generates another exemplary Dialog box 500 as will be discussed in further detail below with respect to FIG. 5.

The border shape drop-down menu list 414, the border color drop-down menu list 416, and border width drop-down menu list 418 all provide various options as their names imply. As options are selected from these drop-down lists, changes are appropriately made to the node depicted in the preview field 404. Similarly, the background color drop-down menu 420 and background pattern drop-down list 422 permit a user to make further changes to the physical characteristics of a particular category of nodes. As mentioned above, the present invention is not limited to the options shown and may include more or fewer options depending upon the characteristics of a particular work project or network diagram. Those skilled in the art will appreciate that various options can be added or deleted or both to the Dialog box 400A without departing from the scope of the present invention.

Figure 5:
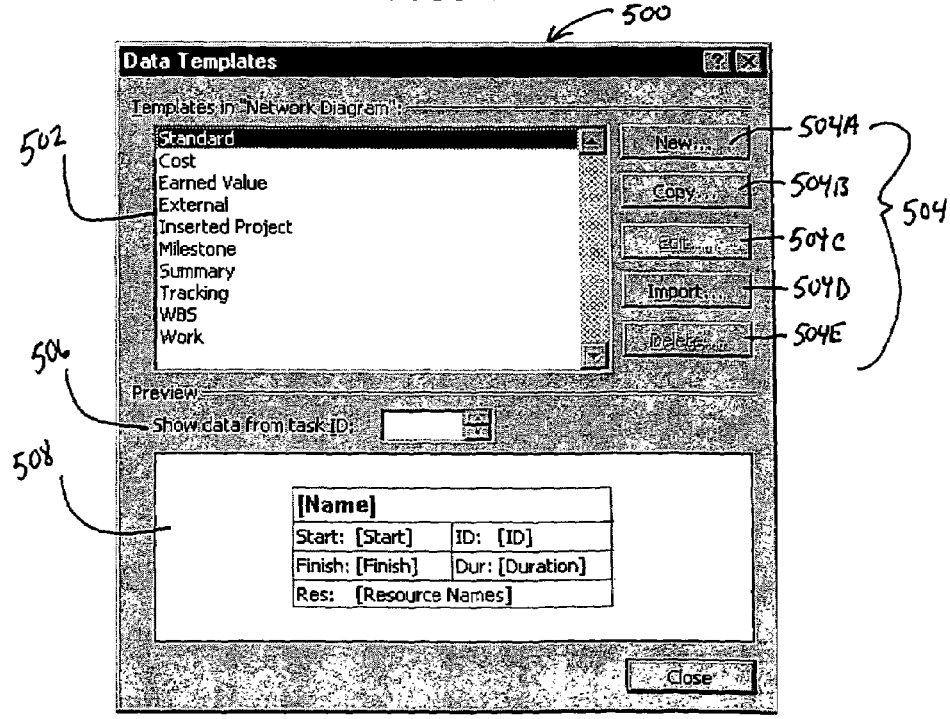
FIG. 5 illustrates another exemplary Dialog box for selecting a template to be used for the layout of data for a particular node or category of nodes.
Figure 6:
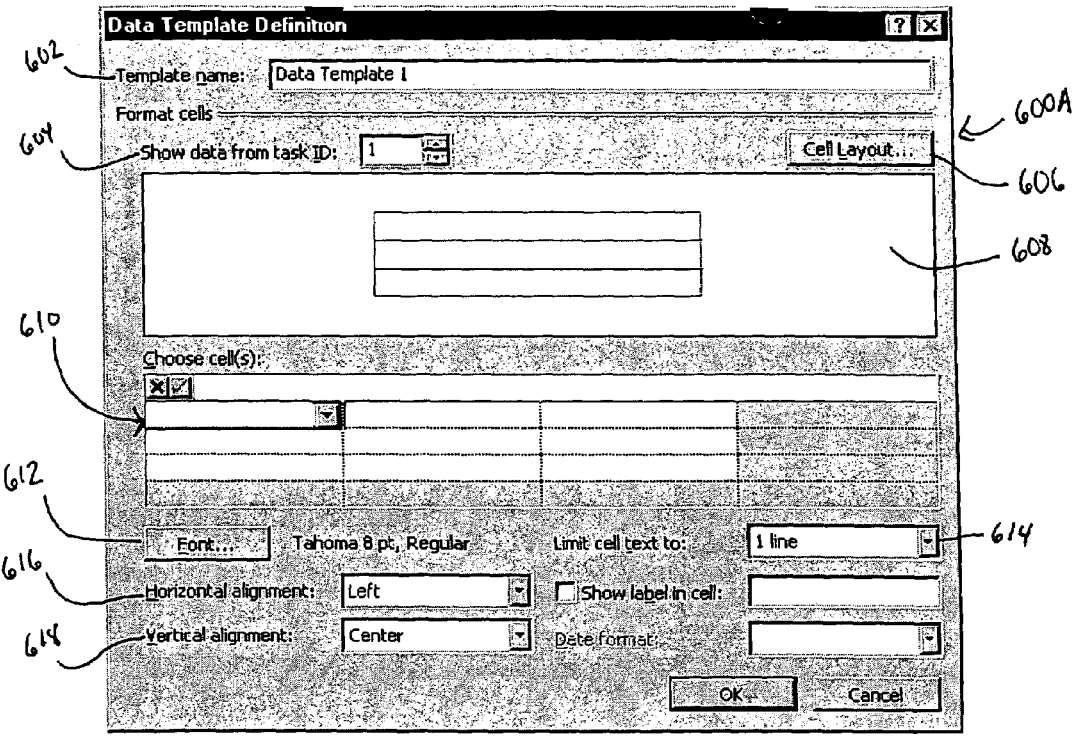
FIG. 6 illustrates a further Dialog box that permits a user to customize a data template.

FIG. 5 illustrates another exemplary Dialog box 500 that is generated upon the activation of the additional templates field or button 412 of FIG. 4. The exemplary data template Dialog box 500 permits the management of various data templates that can be used for the layout of data within network diagram nodes. Various templates can be selected from the menu field or list 502. When a user selects a template from the menu list 502, the user can modify this template in accordance with the template modification buttons 504. For example, if a user desires to create a new data template not listed in data template list 502, then the user would activate the "new" data template modification button 504A. Upon activation of any of the data template modification buttons 504, another Dialog box such as Dialog box 600A as illustrated in FIG. 6 is generated. Other details of Dialog box 600A will be discussed in further detail below with respect to FIG. 6.

If a user desires to copy and then modify an existing template present in the template list 502, the user would highlight the name of the template and then activate data template modification button 504B. Similarly, if the user desires to edit an existing template present in the data template 502, then the user would activate data template modification button 504C. If a user desires to import a data template from another program module, the user would activate the data template modification button 504D. Likewise, if a user desires to delete the template existing in the data template list 502, then the user would highlight the appropriate data template name and activate the data template modification button 504E.

The task ID field 506 of Dialog box 500 permits a user to display data of a particular node within the preview field 508. That is, a user can select the data that is to be displayed within the data template in the preview field 508 by identifying the particular node according to its task identification field. And if no value is entered in the Task ID field, the preview uses placeholder text in place of actual data. Upon activation of either the "new" modification button 504A, the "copy" modification button 504B or the "edit" modification button 504C, the exemplary Dialog box 600A as illustrated in FIG. 6 is generated.

Exemplary data template definition Dialog box 600A includes a template name field 602, a task ID field 604, a cell layout field or button 606, a preview field 608, a select cells grid 610, a font field 612, a limit cell text field 614, a horizontal alignment field 616, and a vertical alignment field 618.[J46] A data template definition Dialog box 600A enables the user to customize or select the format of how data will be displayed within nodes that utilize the template.

With the task ID field 604, a user can view how data will be shown in the data layout for a particular node. With the cell layout field or button 606, the user can select or choose the number of rows and columns for the grid which will form the data layout of a particular data template. Upon activation of the cell layout field or button 606, another exemplary Dialog box 800 is generated. Exemplary cell layout Dialog box 800 will be discussed in further detail below with respect to FIG. 8.

The select field grid 610 permits the user to assign a particular data field to the grid that will be displayed within each node that utilizes the data template in the exemplary network diagram 302A. In other words, a user can pick or choose the data fields that will be present within the grid of a data template. Further details of the selection process will be discussed below with respect to FIG. 7.

The font field button 612 enables the user to select the type of font for the text and numeric data that will be displayed within each cell of a data template. The limit cell text drop-down menu or list 614 permits the user to define how many lines of text will be displayable within each cell. The horizontal alignment field 616 and vertical alignment field 618 permit the user to adjust respective alignments of text within each cell of a grid that will be displayed in each node.[J47]

Figure 7:
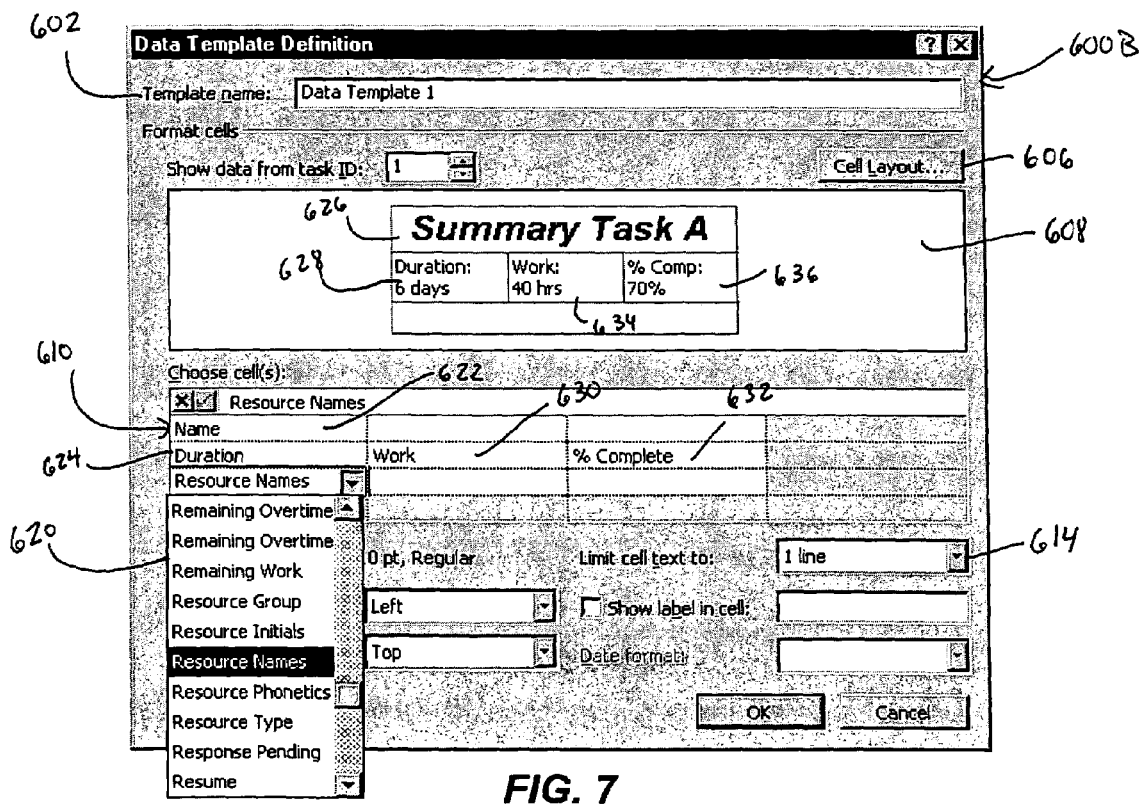
FIG. 7 illustrates another Dialog box identical to the Dialog box of FIG. 6 but demonstrating the actual assignment of fields within a data template.

Referring now to FIG. 7, Dialog box 600B illustrates how the user can customize the cells of a grid for the data within a node. When the cell is selected within the select cell field 610, the drop-down menu list 620 is generated. From the drop-down menu list 620, a particular data field can be selected for display within the grid. For example, as illustrated in FIG. 7, the first cell 622 of the grid was selected and the data field "Name" was chosen for display within this field. In response to this selection of the data field for cell 622, in the preview field 608 corresponding data from task ID no. 1 was illustrated in the first cell 626 of the preview field 608. Similarly, because the "Duration" data field was selected for the second cell 624 of the grid, the duration data for task ID no. 1 was shown in the second cell 628 of the preview field 608. The data in the second and third columns 630, 632 correspond with second and third columns 634, 636 of the preview field 608. As noted above, the type of fields that can be selected for each individual cell that are present in the drop down menu list 620 are not limited to those shown in FIG. 7. Other data fields are not beyond the scope of the present invention.

Figure 8:
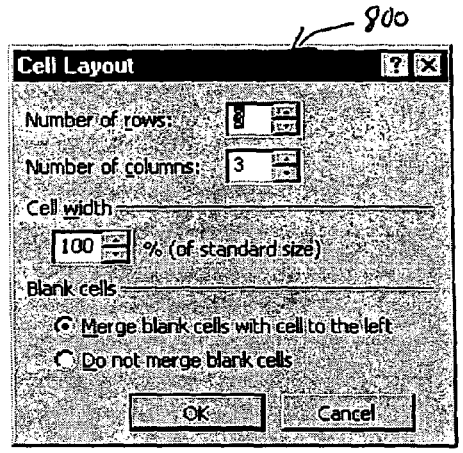
FIG. 8 illustrates another exemplary Dialog box for adjusting the number of rows and columns for a particular data template.

FIG. 8 illustrates the Dialog box 800[J48] that is generated in response to the activation of the cell layout field button 606 of Dialog box 600. The cell layout Dialog box 800 permits the customization for a particular grid of a data template. More specifically, the cell layout Dialog box 800 allows for the adjustment in the number of rows or columns or both of a grid of a data template. The cell layout Dialog box 800 further permits the adjustment of the cell width as well as formatting options to handle blank cells that may be present within the grid of a particular data template.

Figure 9:
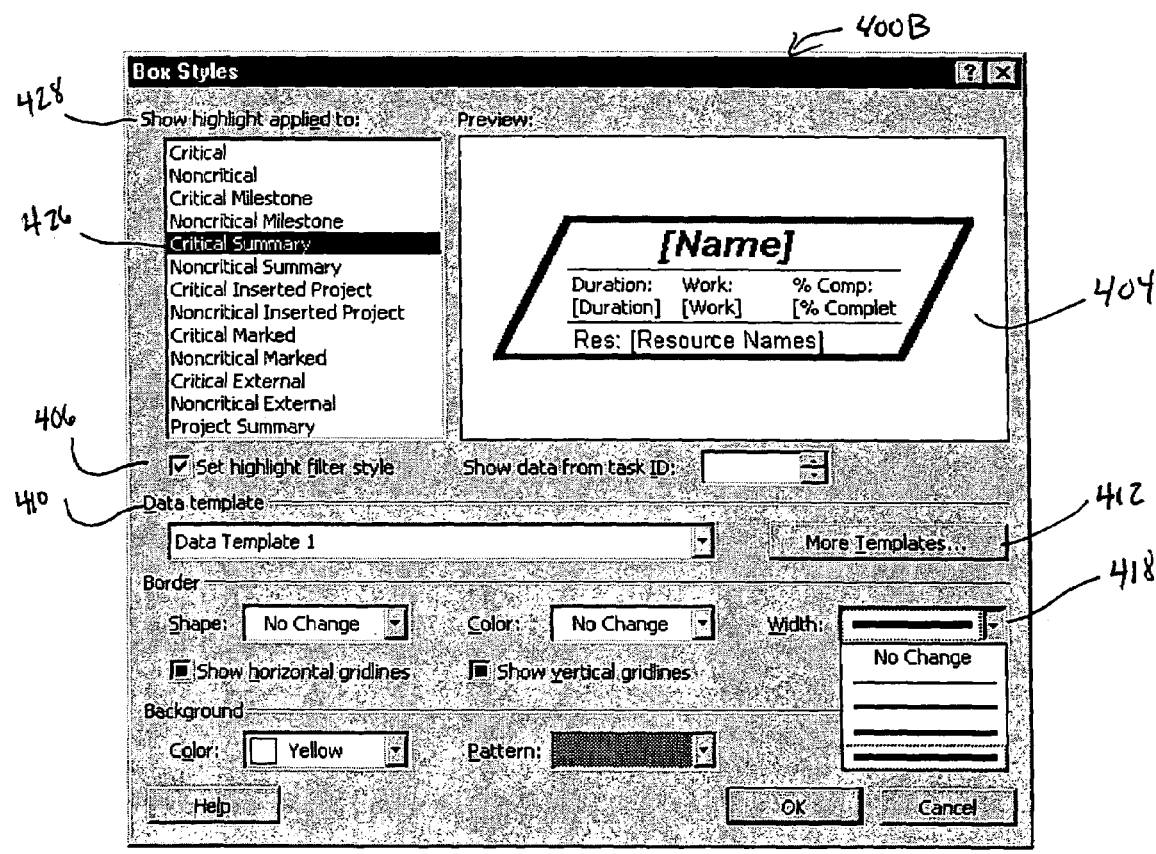
FIG. 9 illustrates another exemplary Dialog box similar to the Dialog box of FIG. 4 but demonstrating the activation of a highlight filter style.

Referring now to FIG. 9, another exemplary box style Dialog box 400B is illustrated. For this exemplary Dialog box 400B, the highlight filter field 406 has been activated. In other words, with this field activated, any changes or selections of the various remaining fields will establish how the highlight filter will look for highlighted nodes that have task data which meets the filter criteria. What selecting a category like "critical summary" 426 does is different while in the highlight settings mode as illustrated in FIG. 9 versus the normal mode of the Box Styles dialog box 400A in FIG. 4. Selecting a different category in the normal mode 400A allows settings to be made for that category. On the other hand, selecting a different category in highlight mode only displays the preview of a node in that category (i.e., the merged settings of highlight filter formatting and the selected node category's formatting are previewed), since in one exemplary embodiment, there is just the one set of highlight filter formatting settings. That is why the text 428 above the category list actually changes when highlight mode is activated, to display "show highlight applied to: instead of "style settings for:" When using the highlight filter option, highlight filter formatting settings are merged with the node category settings for each node that meets the criteria.

More specifically, since the width 418 has been selected for the border and data template 1 (defined in FIG. 7) has been selected for cell layout, this means that all filtered nodes will be shown with a thick border, a yellow-patterned background, and data displayed according to data template 1 when the highlight filter is activated for a network diagram. As mentioned previously, preview field 404 illustrates that the filtered nodes will be transformed with a thicker border, a yellow-patterned background, and data displayed according to the cell layout of data template 1 (defined in FIG. 7) upon activation of the highlight filter, with all other formatting settings being derived from the settings of the node category formatting for the category the node belongs to. The highlight filter field 406 enables the user to set the highlight filtering style and preview it applied to the different categories of nodes. That is, a user can view the formatting options of the highlight filter style for each category of nodes by scrolling down the category menu list 402 while selecting various options for highlight filtering formatting settings (such as border shape, border color, border width, etc.).

Figure 10:
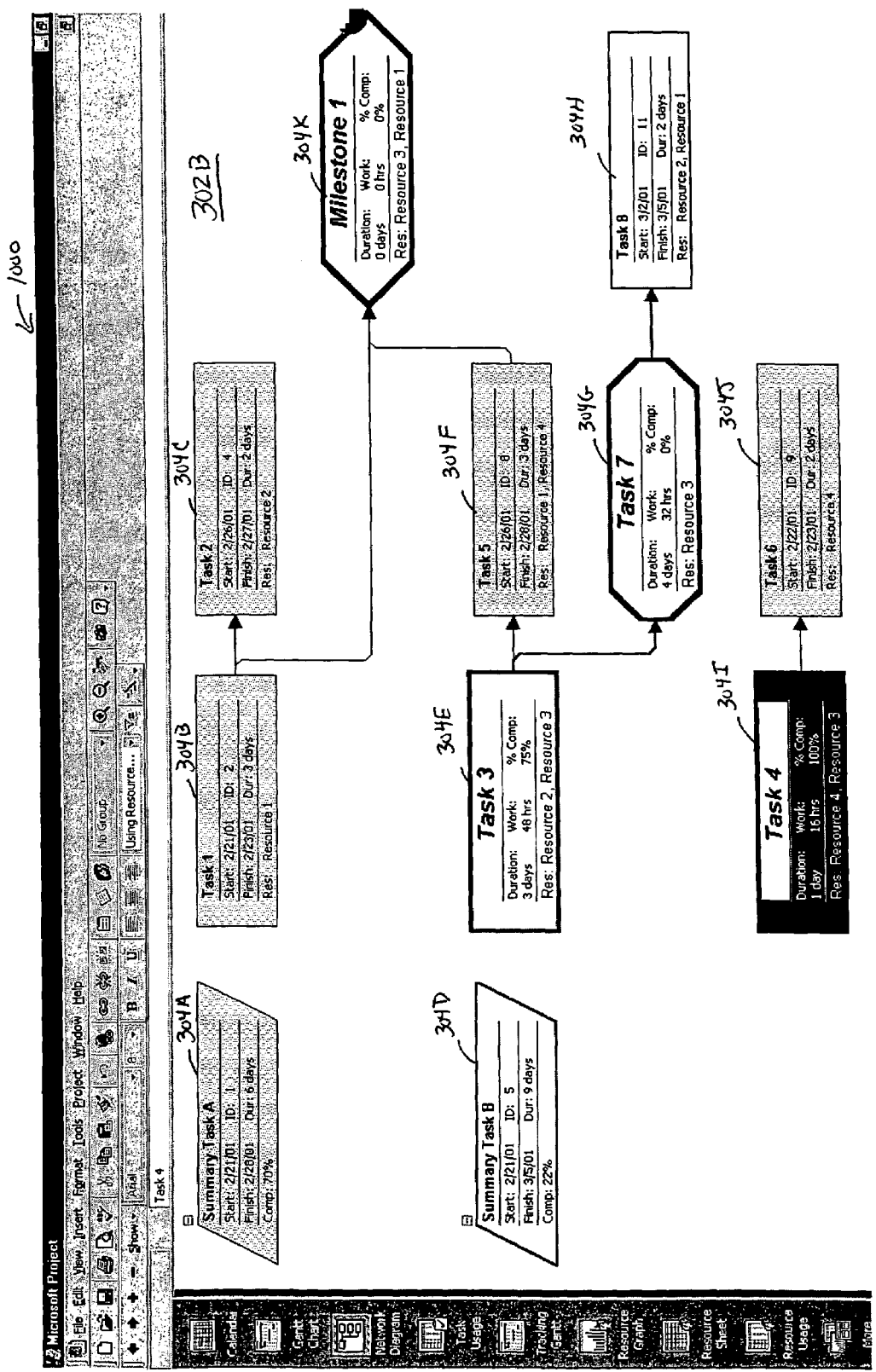
FIG. 10 illustrates another exemplary network diagram that is displayed with a highlight filter style activated and which was created in accordance with the Dialog box illustrated in FIG. 9.

Referring now to FIG. 10, this figure illustrates a display screen 1000 that contains another exemplary network diagram 302B. Exemplary network diagram 302B illustrates a scenario when a highlight filter has been activated in accordance with the highlight filtering style established in FIG. 9. That is, as mentioned above, a box style Dialog box 400B indicates that for all nodes that meet the filter criteria (those assigned to "resource 3" in this case), such nodes will be displayed with a bolded border, a yellow-patterned background, and data according to data template 1 merged with their original node category settings for border shape and border color.

Referring back to FIG. 10, the filter criteria selected for this example (not shown) was all tasks that were assigned to "resource 3." Accordingly, all of the "resource 3" nodes, namely nodes 304E, 304G, 304I, and 304K have been "highlighted" with thick borders, a yellow-patterned background, and display data according to data template 1 defined in FIG. 7. The highlight filtered "resource 3" nodes 304E, 304G, 304I, and 304K correspond to the data set forth in the resource name column 216 as illustrated in FIG. 2. The highlight filter tool permits the user to differentiate a certain group of nodes from all other nodes so that related nodes of interest can be traced within a network diagram.

Figure 11:
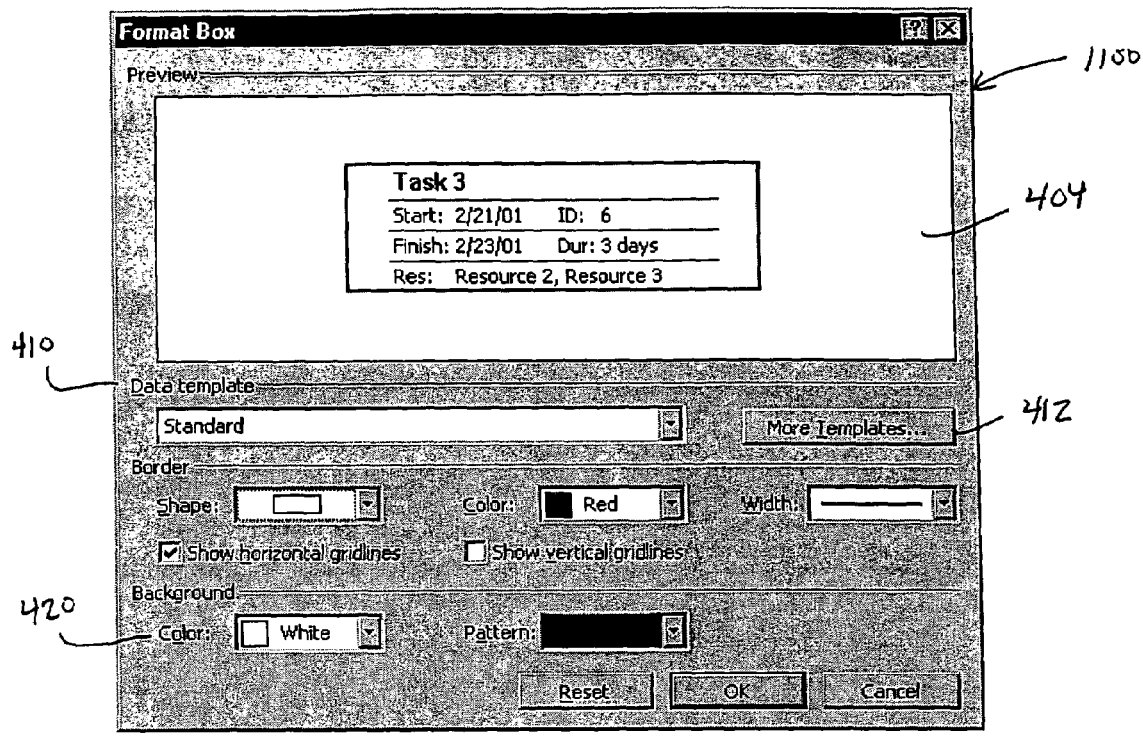
FIG. 11 illustrates yet another exemplary Dialog box for the customization of nodes within a network diagram that are selected by a user.

FIG. 11 illustrates another exemplary Dialog box 1100 that is similar in function with respect to exemplary box style Dialog boxes$_{[JA9]}$ 400A-B. The format box Dialog box 1100 can be activated when the user selects one or more nodes with a cursor or a mouse pointer in order to establish the formatting options for such nodes. The difference between Dialog box 1100 and Dialog boxes 400A-B is that Dialog box 1100 assigns node formatting options according to nodes that are selected by a user while Dialog boxes 400A-B assigns node formatting options for nodes based upon category. The node formatting options of exemplary format Dialog box 1100 are similar to those of the box style Dialog boxes 400A-B mentioned above. Therefore, these options will not be discussed with respect to this figure.

Figure 12:
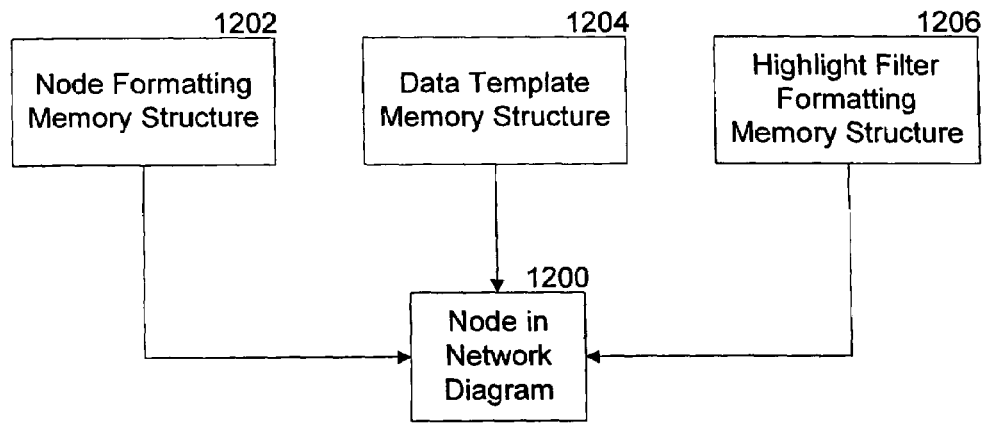
FIG. 12 illustrates an exemplary schematic of structured memory for node information of the present invention.

Referring now to FIG. 12, this figure illustrates a functional block diagram of memory for node information of the present invention. Each node 1200 within a network diagram has separate data for the physical characteristics of the node as well as for the layout of the data contained within a node. Therefore, the node 1200 within a network diagram is rendered according to a node formatting memory structure 1202, a data template memory structure 1204, and a highlight filter formatting memory structure 1206. The node formatting memory structure 1202 can correspond to the data acquired in the box style Dialog box 400A of FIG. 4 and box format Dialog box 1100. The data template memory structure 1204 can correspond to the data that is acquired with the data template Dialog box 500 as well as the data template definition Dialog boxes 600 and cell layout Dialog box 800. The highlight filter formatting memory structure 1206 can correspond to the data that is acquired with the box style dialog box 400B of FIG. 9. In summary, for each node 304 in a network diagram, three separate memory structures can be maintained in order to render the display of a particular node.

Figure 13:
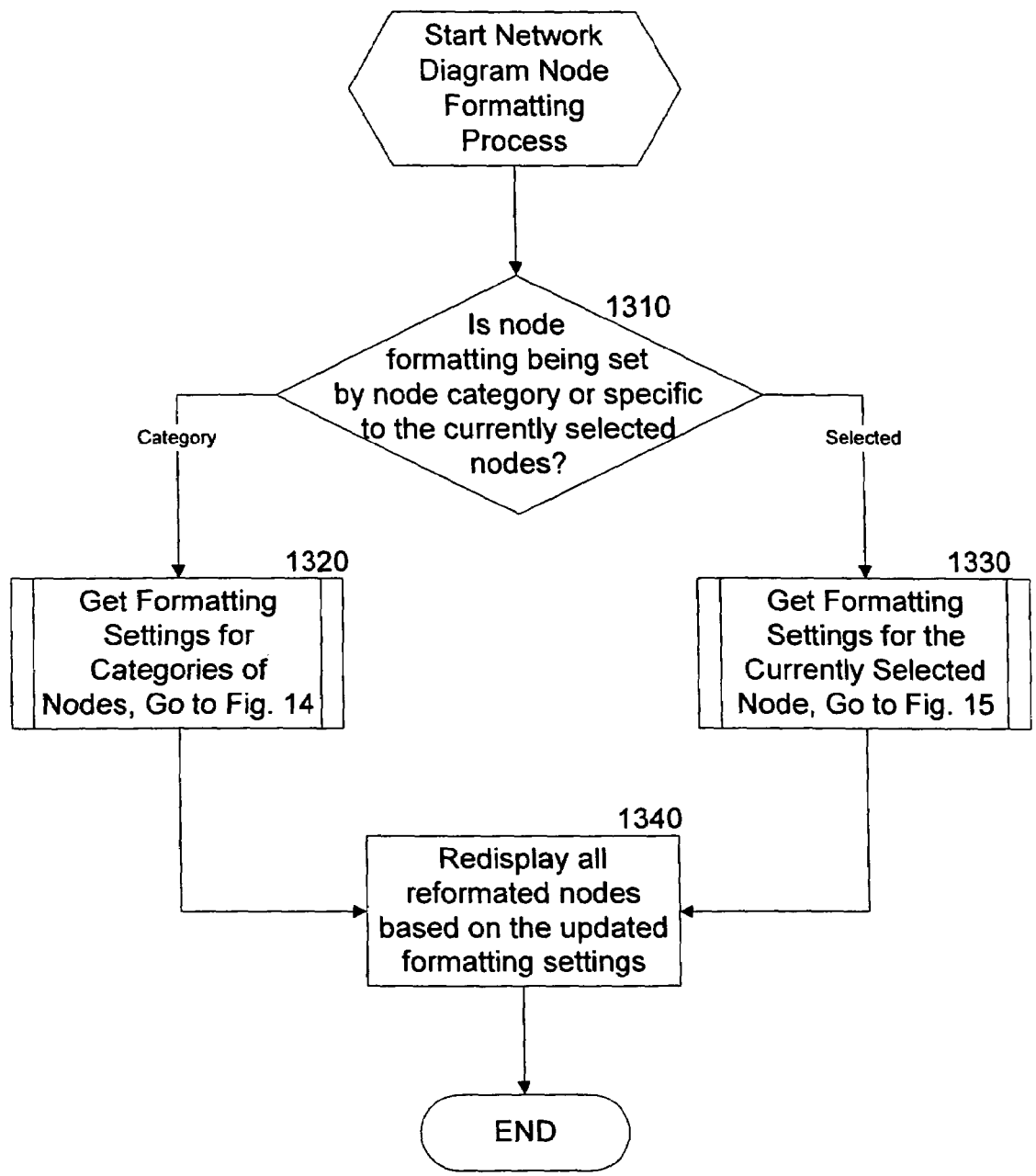
FIG. 13 is a logic flow diagram illustrating an exemplary overview process for adjusting the formatting of selected nodes or categories of nodes.

FIG. 13 illustrates an overview of a computer-implemented process for acquiring node formatting information in accordance with the box style dialog box of FIG. 4 and the format box dialog box 1100 of FIG. 11. Decision step 1310 is the first step in the process where it is determined whether node formatting is being set by node category or by nodes that are selected by a user. If the inquiry to decision step 1310 is by "category", then the "category" branch is followed to routine 1320 in which the formatting settings for categories of nodes are obtained. Further details of routine 1320 will be discussed with respect to FIG. 14.

If the inquiry to decision step 1310 is "selected", then the "selected" branch is followed to routine 1330. In routine 1330, formatting settings for nodes that are selected by a user are obtained. Further details of routine 1330 will be discussed with respect to FIG. 15 below. Next, in step 1340, nodes are displayed with the new formatting options selected by a user.

Figure 14:
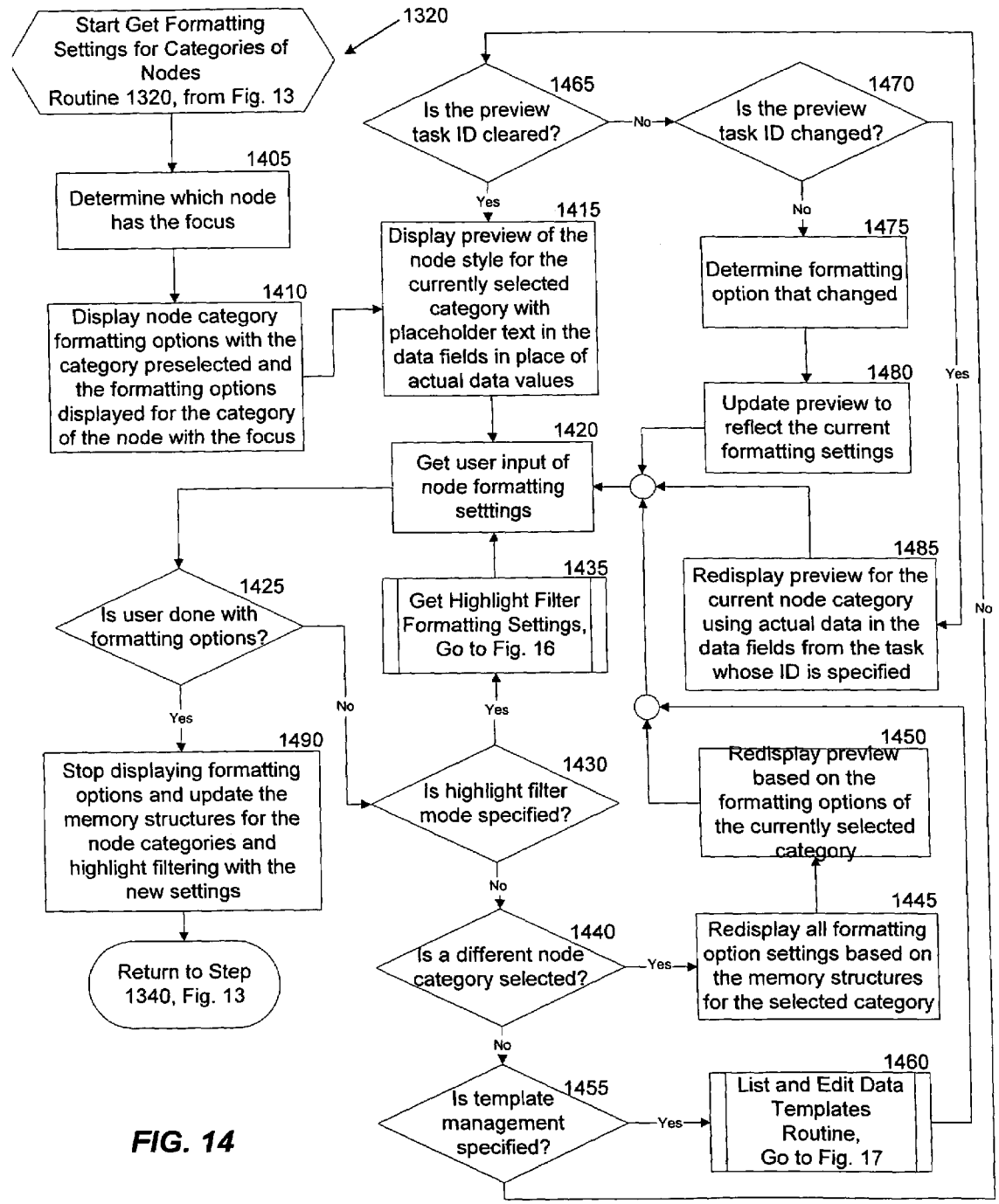
FIG. 14 is a logic flow diagram illustrating a formatting setting by category routine of FIG. 13.

Referring now to FIG. 14, this figure illustrates a computer-implemented process for the formatting by categories routine 1320 of FIG. 13. Step 1405 is the first step in the process in which it is determined what particular node has the focus. Next, in step 1410 the node category formatting options with a category pre-selected are displayed. The formatting options are also displayed for the category of the node with the focus. For example, step 1410 corresponds to the Box Style dialog box of FIG. 400A of FIG. 4. In this exemplary embodiment, a "critical" categorized node had focus prior to the activation of the box style dialog box 400A. Hence, the "critical" category in the style settings menu 402 is highlighted. The default settings for the "critical" category of nodes are displayed to the user. In this particular example, all of the "critical" nodes have a "standard" data template, a rectangular border shape, a red colored border, a white background and a dark fill pattern. See the data template selection field 410, the border shape drop-down menu 414, the border color drop-down menu 416, the border width drop-down menu 418, the background color drop-down menu 420, and the background pattern drop-down menu 422.

In step 1415, a preview of the node style for the currently selected category with placeholder text in the data fields in place of actual data values are displayed. Step 1415 corresponds to the preview field 404 as illustrated in Box Style dialog box 400A of FIG. 4. In step 1420, the node formatting settings are obtained. Subsequently, in decision step 1425, it is determined whether the entering of formatting options is completed. If the inquiry to decision step 1425 is positive, then the "Yes" branch is followed to step 1490 in which the display of formatting options is stopped and the memory structures for the node categories and highlight filtering with the new settings are updated.

If the inquiry to decision step 1425 is negative, then the "No" branch is followed to decision step 1430 in which it is determined whether the highlight filter mode has been activated. If the inquiry to decision step 1430 is negative, then the "No" branch is followed to decision step 1440. In decision step 1440, it is determined whether a different category of nodes has been selected.

If the inquiry to decision step 1430 is positive, then the "Yes" branch is followed to routine 1435 in which the highlight filter formatting settings are obtained from the user. Further details of routine 1435 will be discussed with respect to FIG. 16 below. After step 1435, the process returns to step 1420 in which input for the node formatting settings is obtained.

If the inquiry to decision step 1440 is negative, then the "No" branch is followed to decision step 1455. If the inquiry to decision step 1440 is positive, then the "Yes" branch is followed to decision step 1445. In step 1445, all formatting option settings based on a memory structure for the selected category are redisplayed. Next, in step 1450, the preview 404 based on the formatting options of a currently selected category is redisplayed. The process then proceeds back to step 1420.

If the inquiry to decision step 1440 is negative, then the "No" branch is followed to decision to step 1455 in which it is determined whether the "more templates" button 412 has been activated. If the inquiry to decision step 1455 is positive, then the "Yes" branch is followed to routine 1460 in which the data templates are listed to a user. Further details of routine 1460 will be discussed below with respect to FIG. 17.

If the inquiry to decision step 1455 is negative, then the "No" branch is followed to decision step 1465. In decision step 1465, it is determined whether the preview Task ID 408 has been cleared. If the inquiry to decision step 1465 is positive, then the "Yes" branch is followed back to step 1415. If the inquiry to decision step 1465 is negative, then the "No" branch is followed to decision step 1470.

In decision step 1470, it is determined whether the Task ID field 408 has been changed. If the inquiry to decision step 1470 is positive, then the "Yes" branch is followed to step 1485. In step 1485, the preview 404 for the current node category is redisplayed using actual data in the data field from the Task ID that is specified. The process then proceeds back to step 1420.

If the inquiry to decision step 1470 is negative, then the "No" branch is followed to step 1475. In step 1475, it is determined whether a formatting option has been changed. Next, in step 1480, if a formatting option has been changed, then the preview 404 is updated to reflect the current formatting settings of the currently selected node category in category menu 402. The process then proceeds back to step 1420.

Figure 15:
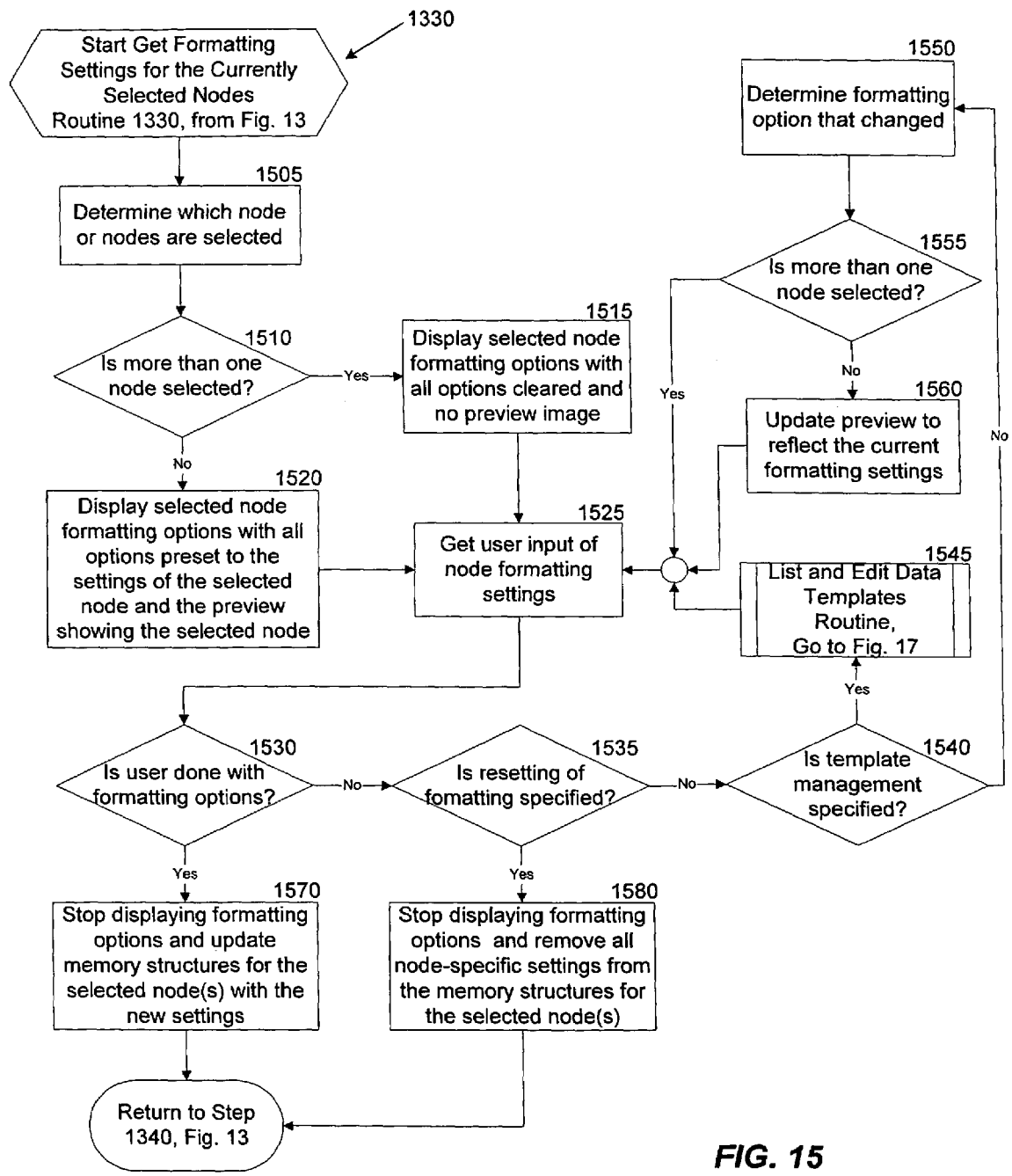
FIG. 15 is a logic flow diagram illustrating another exemplary formatting settings by selected nodes routine of FIG. 13.

Referring now to FIG. 15, this figure illustrates a computer-implemented process for the formatting settings of selected nodes routine 1330 of FIG. 13. Step 1505 is the first step in the process in which it is determined which node or nodes have been selected by a user. In decision 1510 it is determined whether more than one node has been selected. If the inquiry to decision step 1510 is positive, then the "Yes" branch is followed to step 1515. In step 1515, the node formatting options are displayed where all of the options (fields) are cleared and no preview image is displayed.

The inquiry to decision step 1510 is negative, then the "No" branch is followed to step 1520. In step 1520, the selected node formatting options with all options preset to the settings of the selected node and a preview 404 showing the selected node are displayed. Next, in step 1525, the node formatting settings for the selected node or nodes are obtained.

In decision step 1530, it is determined whether the entering of formatting options has been completed. If the inquiry to decision step 1530 is positive, then the "Yes" branch is followed to step 1570 in which the memory structure for the selected node or nodes with the new settings are updated. If the inquiry to decision step 1530 is negative, then the "No" branch is followed to decision step 1535. In the decision step 1535, it is determined whether resetting of formatting options has been selected.

If the inquiry to decision step 1535 is positive, then the "Yes" branch is followed to step 1580 in which all node-specific settings from the memory structure for the selected node or nodes are removed. If the inquiry to decision step 1535 is negative, then the "No" branch is followed to decision step 1540 in which it is determined whether the "more templates" button 412 has been selected. If the inquiry to decision step 1540 is positive, then the "Yes" branch is followed to routine 1545 in which the data templates are displayed to a user for selection and modification thereof. Further details of routine 1545 will be discussed with respect to FIG. 17 below. The process then proceeds back to step 1525.

If the inquiry to decision step 1540 is negative, then the "No" branch is followed to step 1550 in which it is determined which formatting option has been changed. In decision step 1555, it is determined whether more than one node has been selected by a user. If the inquiry to decision step 1555 is negative, then the "No" branch is followed to step 1560 in which the preview 404 is updated to reflect the current formatting settings. If the inquiry to decision step 1555 is positive, then the "Yes" branch is followed back to step 1525.

Figure 16:
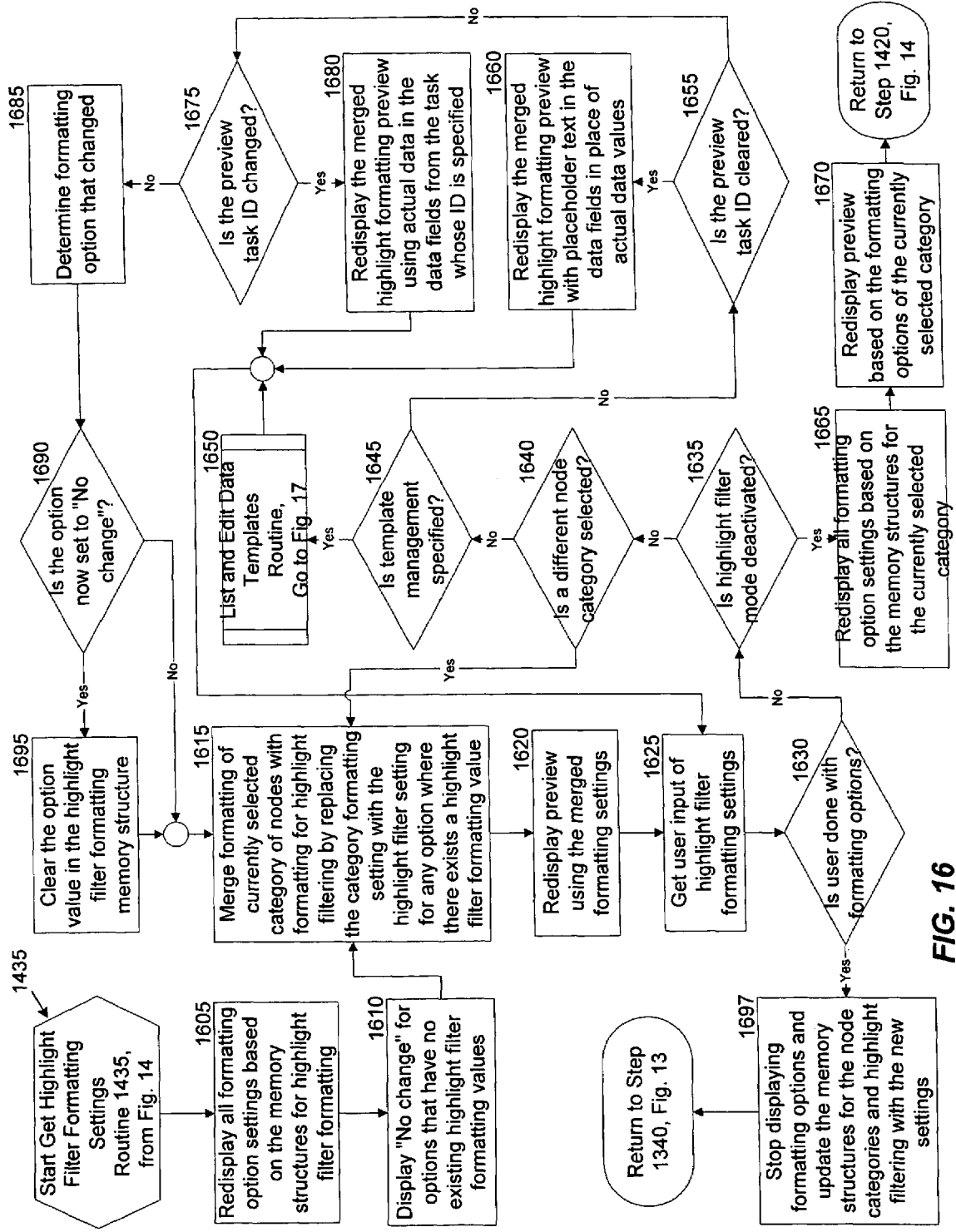
FIG. 16 is a logic flow diagram illustrating an exemplary process for selecting highlight filtering formatting options.

Referring now to FIG. 16, this figure illustrates another computer-implemented process for the highlight filter formatting routine 1435 of FIG. 14. Step 1605 is the first step in the process in which all formatting option settings based on the memory structure for the highlight filter formatting are redisplayed. Next, in step 1610, for options that have no existing highlight filter formatting values, a phrase "no change" is displayed. In step 1615, formatting of the currently selected category of nodes is merged with formatting for highlight filtering by replacing the category formatting setting with the highlight filter setting for any option where there exists a highlight filter formatting value.

In step 1620, a preview 404 as illustrated in box style dialog box 400B of FIG. 9 that uses the merge formatting settings is redisplayed. In step 1625, the highlight filter formatting settings are obtained. In decision step 1630 it is determined whether entry of formatting options has been completed. If the inquiry to decision step 1630, is positive, then the "Yes" branch is followed to step 1697 in which the memory structures for the nodes category and highlight filtering with the new settings are updated. If the inquiry to decision step 1630 is negative, then the "No" branch is followed to decision step 1635.

In decision step 1635, it is determined whether the highlight filter mode has been deactivated. If the inquiry to decision step 1635 is positive, then the "Yes" branch is followed to step 1665 in which all formatting option settings based on the memory structure for the currently selected category are redisplayed. Next, in step 1670 the preview 404 based on the formatting options of the currently selected category are redisplayed.

If the inquiry to decision step 1635 is negative, then the "No" branch is followed to decision step 1640. In decision step 1640, it is determined whether a different node category has been selected. If the inquiry to decision step 1640 is positive, the then "Yes" branch is followed back to step 1615. If the inquiry to decision step 1640 is negative, then the "No" branch is followed to decision step 1645.

In decision step 1645, it is determined whether the "more templates" button 412 of FIG. 9 has been selected. If the inquiry to decision step 1645 is positive, then the "Yes" branch is followed to routine 1650 in which the data templates are listed for selection and editing by the user. Further details of routine 1650 will be discussed below with respect to FIG. 17.

If the inquiry to decision step 1645 is negative, then the "No" branch is followed to decision step 1655 in which it is determined whether the preview Task ID field 408 of FIG. 9 has been cleared. If the inquiry to decision step 1655 is positive, then the "Yes" branch is followed to step 1660 in which the merged highlight formatting preview 404 with placeholder text in the data fields in place of actual values is redisplayed. The process then proceeds back to step 1625.

If the inquiry to decision step 1655 is negative, then the "No" branch is followed to decision step 1675. In decision step 1675, it is determined whether a preview Task ID field 408 of FIG. 9 has been changed. If the inquiry to decision step 1675 is positive, then the "Yes" branch is followed to step 1680. In step 1680, a merged highlight formatting preview 404 of FIG. 9 is displayed using actual data in the data fields from the task whose ID is specified. The process then proceeds back to step 1625.

If the inquiry to decision step 1675 is negative, then the "No" branch is followed to step 1685. In step 1685, it is determined which formatting option has been changed. Next, in decision step 1690, it is determined whether an option that has been selected is now set to "no change." If the inquiry to decision step 1690 is positive, then the "Yes" branch is followed to step 1695. In step 1695, the option value in the highlight filter formatting memory structure is cleared. If the inquiry to decision step 1690 is negative, then the "No" branch is followed back to step 1615.

Figure 17:
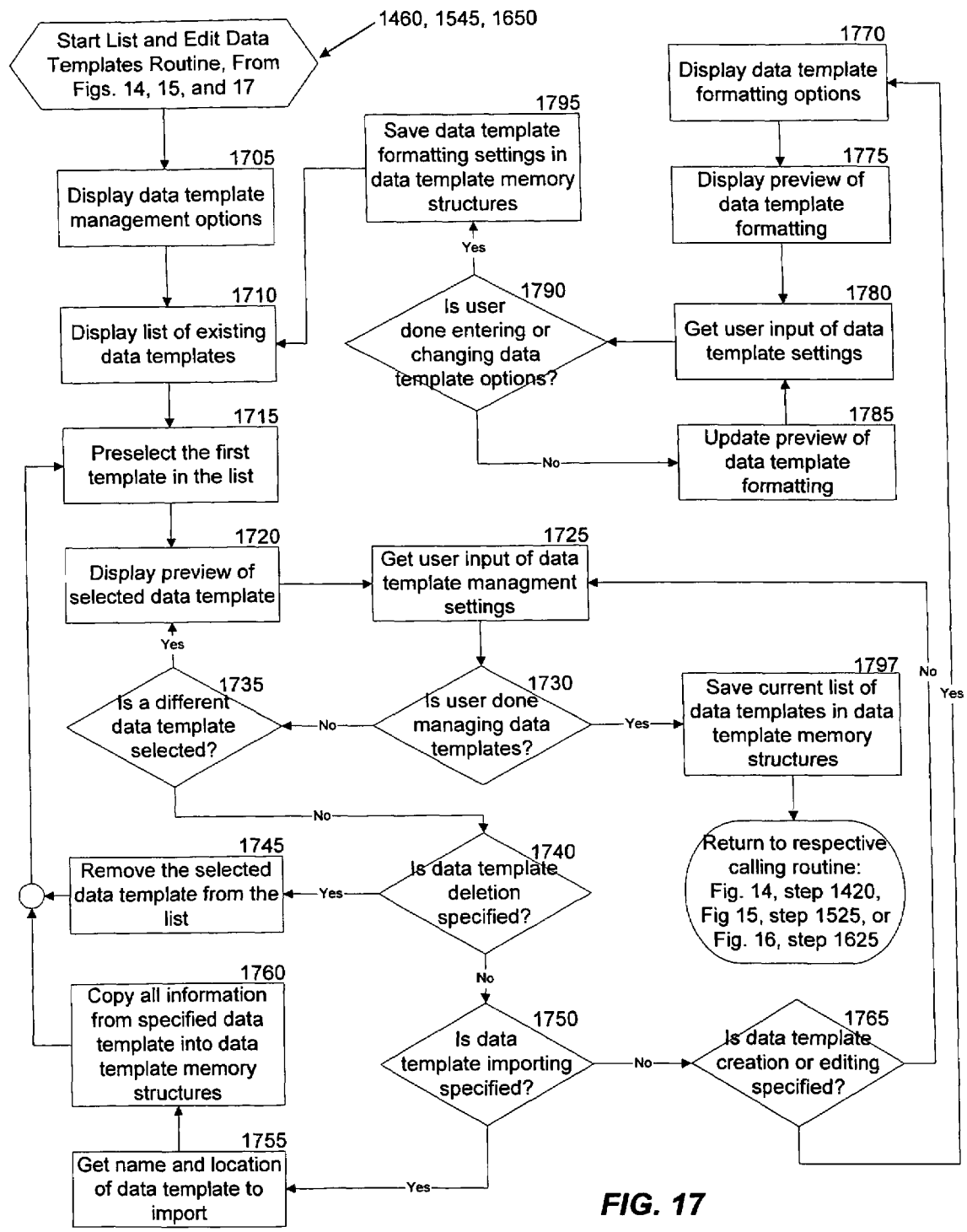
FIG. 17 is a logic flow diagram illustrating an exemplary process for listing and editing data template routines of FIGS. 14, 15, and 16.

Referring now to FIG. 17, this figure illustrates a computer-implemented process for the list and edit data template routines 1460, 1545, and 1650 of FIGS. 14, 15, and 16, respectively. Step 1705 is the first step in the process in which the data template management options are displayed. For example, the data templates dialog box 500 is displayed to a user. This dialog box provides a menu field of list 502 that can be selected by a user. In step 1710, the list of existing data templates is displayed. In one exemplary embodiment, the first template in the list 502 is pre-selected in accordance with step 1715. In step 1720, a preview 508 of the selected data template is displayed. In step 1725, data template management settings are obtained. In decision step 1730, it is determined whether the input of data template management settings is completed. If the inquiry to decision step 1730 is negative, then the "No" branch is followed to decision step 1735. In decision step 1735, it is determined whether a different data template has been selected. If the inquiry to decision step 1735 is positive, then the "Yes" branch is followed back to step 1720. If the inquiry to decision step 1735 is negative, then the "No" branch is followed to decision step 1740.

If the inquiry to decision step 1730 is positive, then the "Yes" branch is followed to step 1797. In step 1797, the current list of data templates is saved in the data template memory structure. In decision step 1740, it is determined whether a data template deletion operation has been selected or specified. If the inquiry to decision step 1740 is positive, then the "Yes" branch is followed to step 1745 in which the selected data template is removed from the list 502 of FIG. 5. If the inquiry to decision step 1740 is negative, then the "No" branch is followed to decision step 1750.

In decision step 1750, it is determined whether a data template importing function has been selected or specified. For example, this step determines whether the "import" button 504D has been selected. If the inquiry to decision step 1750 is positive, then the "Yes" branch is followed to step 1755. In step 1755, the appropriate information about the data template, such as its name and location are obtained. Next, in step 1760, all information from the specified data template is copied into the data template memory structure.

If the inquiry to decision step 1750 is negative, then the "No" branch is followed to decision step 1765. In decision step 1765, it is determined whether a data template creation or editing function has been specified or selected. In other words, it is determined whether the "new" button 504A or the "edit" button 504C have been selected. If the inquiry to decision step 1765 is negative, then the "No" branch is followed to step 1725. In step 1725, data template management settings are obtained.

If the inquiry to decision step 1765 is positive, then the "Yes" branch is followed to step 1770 in which the data template formatting options are displayed. For example, the data template definition dialog box 600A can be displayed to the user. In step 1775, a preview 608 of the data template formatting is then displayed to a user. Next, in step 1780, data template settings are obtained. In decision step 1790, it is determined whether the entering or changing of data template options has been completed. If the inquiry to decision step 1790 is positive, then the "Yes" branch is followed to step 1795. In step 1795, the data template formatting settings are saved in the data template memory structure. If the inquiry decision step 1790 is negative, then the "No" branch is followed to step 1785. In step 1785, the preview 608 of the data template formatting is updated.

Figure 18:
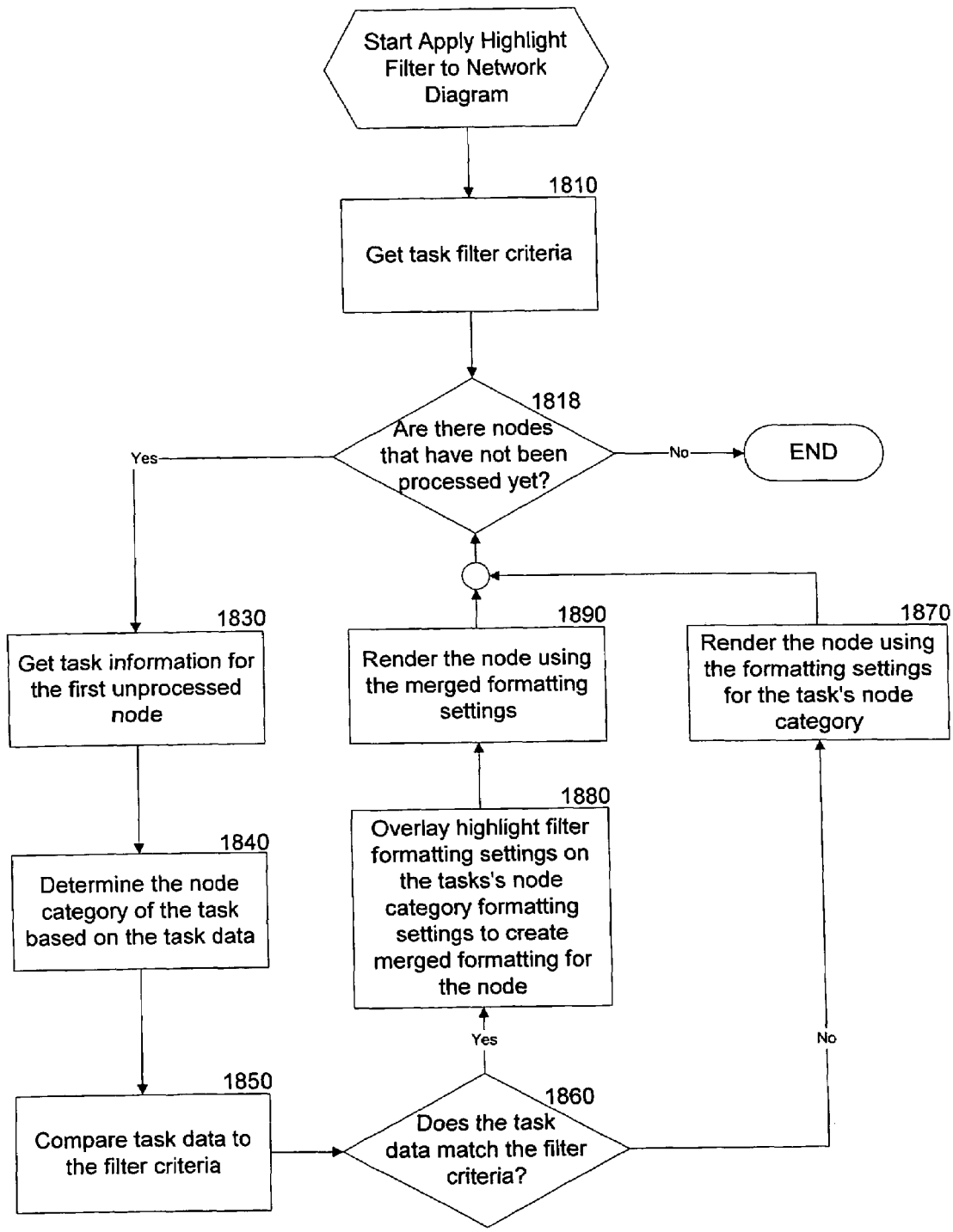
FIG. 18 is a logic flow diagram illustrating an exemplary process for applying highlight filtering options to nodes within a network diagram.

FIG. 18 illustrates a computer-implemented process for applying highlight filtering node formatting options to a network diagram. Step 1810 is the first step in the process in which filter criteria is obtained. Next, in step 1818, it is determined whether there are nodes that have not been processed. That is, it is determined whether there are any nodes in the network diagram that have not been reformatted in accordance with the highlight filtering options that correspond to the selected filter criteria. If the inquiry to decision step 1818 is positive, then the "Yes" branch is followed to step 1830. In step 1830, information for an unprocessed node is obtained. In step 1840, the node category of the task is determined based on the task data that was imported in the project data 202 of FIG. 2.

Next, in step 1850, the task data for a particular node is compared to the filter criteria that was selected. In step 1860, it is determined whether the task data matches the filter criteria. If the inquiry to decision step 1860 is negative, then the "No" branch is followed to step 1870 in which the node is rendered using the formatting settings for the task node category. If the inquiry to decision step 1860 is positive, then the "Yes" branch is followed to step 1880. In step 1880, the highlight filter formatting settings are overlaid on a task node category formatting settings to create merged formatting for a particular node. Next, in step 1890, a node using the merged formatting settings of step 1880 is displayed. The process then proceeds back to decision step 1818. If the inquiry to decision step 1818 is negative, then the "No" branch is followed where the process ends.

Figure 19:
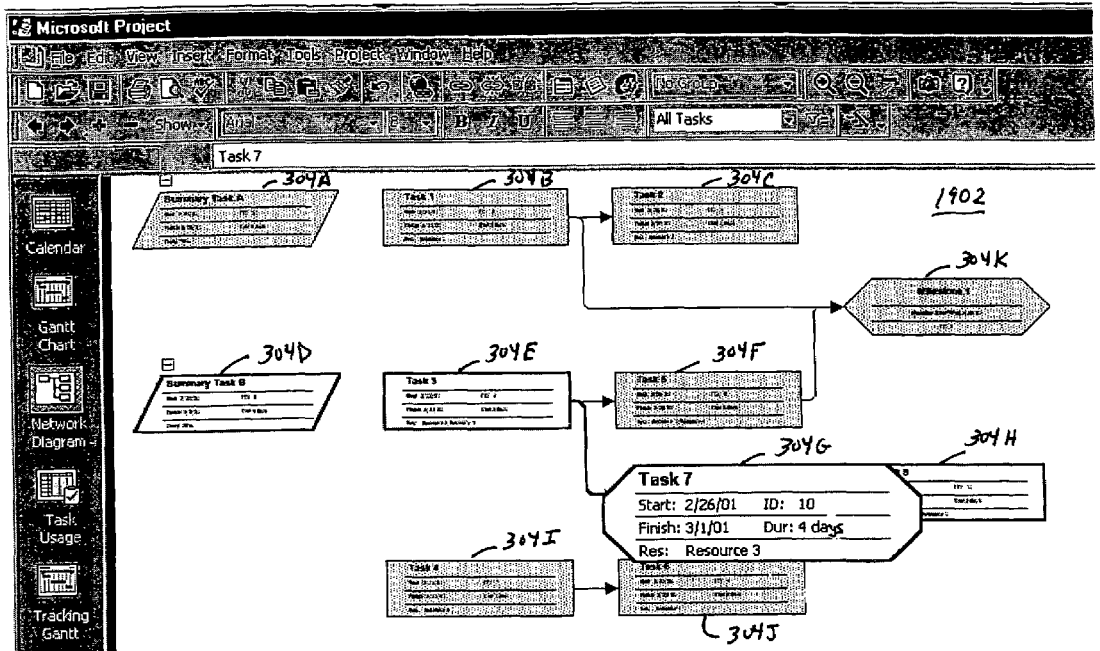
FIG. 19 illustrates another exemplary network diagram that magnifies one or more nodes or a region of nodes based upon mouse pointer or cursor movement.
Figure 20:
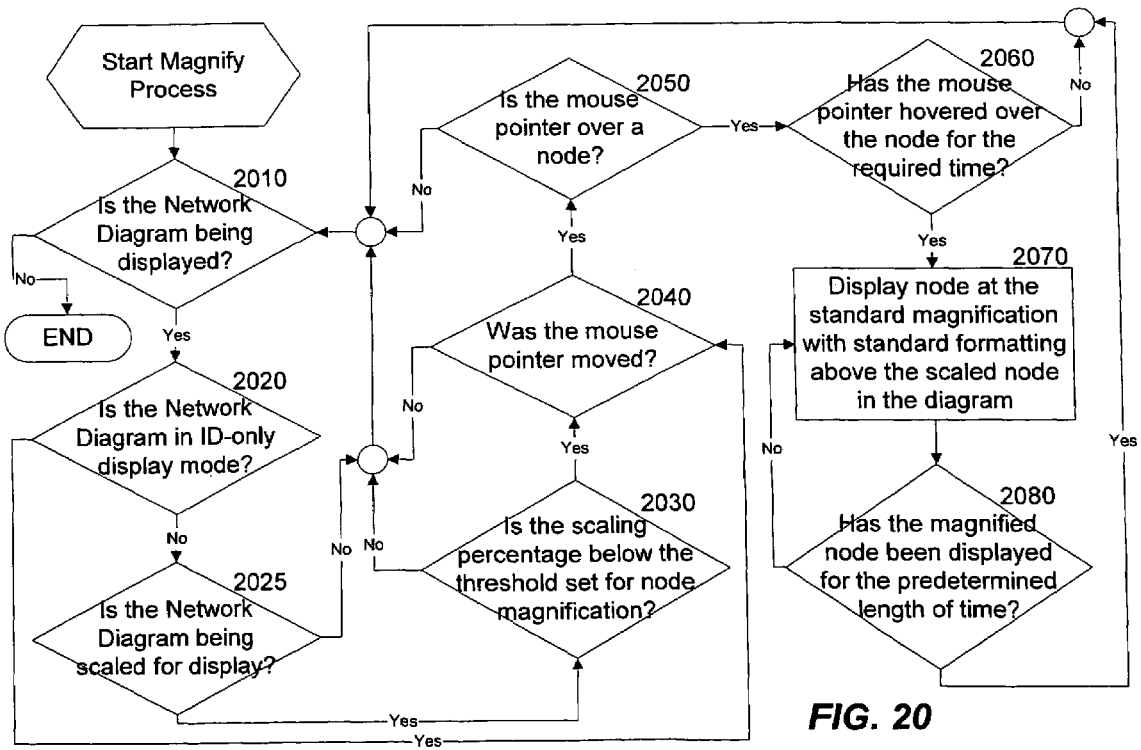
FIG. 20 is a logic flow diagram illustrating an exemplary process for magnifying one or more nodes or a region of nodes based upon mouse pointer or cursor movement.

Referring now FIGS. 19-20, these figures illustrate a computer-implemented process for enlarging one or more nodes in response to mouse pointer movement or cursor movement. More specifically, FIG. 19 illustrates node 304G being enlarged or magnified relative to the remaining nodes in network diagram 1902. FIG. 20 illustrates the computer-implemented process that carries out the enlargement or magnification process of FIG. 19. Decision step 2010 is the first step of the process illustrated in FIG. 20 in which it is determined whether a network diagram is being displayed. If the inquiry to decision step 2010 is negative, then the "No" branch is followed where the process ends. If the inquiry to decision step 2010 is positive, then the "Yes" branch is followed to decision step 2020. In decision step 2020, it is determined whether the network diagram is being displayed in an ID-only mode.

If the inquiry to decision step 2020 is negative, then the "No" branch is followed to decision step 2025. In decision step 2025, it is determined whether the network diagram is being scaled for display on a display device. If the inquiry to decision step 2025 is positive, then the "Yes" branch is followed to decision 2030. If the inquiry to decision step 2025 is negative, then the "No" branch is followed back to decision step 2010.

If the inquiry to decision step 2020 is positive, then the "Yes" branch is followed to decision step 2040. In decision step 2040, it is determined whether a mouse pointer has been moved. If the inquiry to decision step 2040 is negative, then the "No" branch is followed back to decision step 2010. If the inquiry to decision step 2040 is positive, then the "Yes" branch is followed to decision step 2050. In decision step 2030, it is determined whether a scaling of a network diagram is below a predetermined magnification threshold. If the inquiry to decision step 2030 is negative, then the "No" branch is followed back to step 2010. If the inquiry to decision step 2030 is positive, then the "Yes" branch is followed to decision step 2040.

In decision step 2050, it is determined whether the mouse pointer is within a predefined region that contains a node or if the mouse pointer is present over a node. If the inquiry to decision step 2050 is negative, then the "No" branch is followed back to decision step 2010. If the inquiry to decision step 2050 is positive, then the "Yes" branch is followed to decision step 2060.

In decision step 2060, it is determined whether the mouse pointer is stationary or is present over a node for a predetermined amount of time. If the inquiry to decision step 2060 is negative, then the "No" branch is followed back to decision step 2010. If the inquiry to decision step 2060 is positive, then the "Yes" branch is followed to step 2070. In step 2070, a node corresponding to the location of the mouse pointer or the cursor is displayed at standard magnification with standard formatting above the scaled node in the network diagram.

Next, in decision step 2080, it is determined whether a magnified node has been displayed for a predetermined period or length of time. If the inquiry to decision step 2080 is negative, then the "No" branch is followed back to step 2070. If the inquiry to decision step 2080 is positive, then the "Yes" branch is followed to decision step 2010.

It should be understood that the foregoing relates only to the illustrative embodiments of the present invention, and that numerous changes may be made therein without department from the spirit and scope of the invention as defined by the following claims.

What is claimed is:

1. A method performed by a computer system for generating a network diagram with nodes at different magnification levels comprising the steps of:
    storing in memory of the computer system a threshold for a scaling percentage;
    displaying one or more nodes of a network diagram, each node having associated data and an associated unique identifier, the network diagram being displayed in either ID-only mode or not in ID-only mode, wherein when the network diagram is displayed in ID-only mode, the display of each node includes displaying a unique identifier associated with each node and does not include displaying any other data associated with the node and when the network diagram is displayed not in ID-only mode, it is displayed with a scaling percentage and the display of each node includes displaying data associated with the node other than the unique identifier associated with the node;
    determining whether a mouse pointer is positioned in a predefined region containing a node; and
    in response to a mouse pointer intersecting the predefined region,
    when the network diagram is being displayed in ID-only mode,
        displaying one or more of the nodes at an increased magnification level relative to other nodes in the network diagram, and
    in response to a mouse pointer leaving the predefined region, displaying the one or more nodes at a scaling percentage that is below the threshold,
    when network diagram is being displayed not in ID-only mode but with a scaling percentage that is below the threshold,
        displaying one or more of the nodes at an increased magnification level relative to other nodes in the network diagrams, and
    in response to a mouse pointer leaving the predefined region, displaying the one or more nodes at a scaling percentage that is below the threshold, and
    when the network diagram is being displayed not in ID-only mode and with a scaling percentage that is not below the threshold, not adjusting the display of any node.

2. The method of claim 1, further comprising determining whether a magnified node has been displayed for a predetermined length of time and when it is determined that the magnified node has been displayed for a predetermined length of time, displaying the magnified node at a reduced size.

3. The method of claim 1, wherein the predefined region comprises a drawing area containing a plurality of nodes.

4. The method of claim 1, further comprising determining whether the mouse pointer has been positioned in the predefined region containing the node for a predetermined period of time before displaying the one or more nodes at the increased magnification level.

5. A computer-readable storage medium with instructions for controlling a computing device to display nodes representing tasks of a project, by a method comprising:
    providing project data for the project, the project data identifying tasks of the project,
        each task being defined by task data and assigned a unique identifier:
    displaying a network diagram having nodes representing tasks of the project, a node containing task data, the network diagram being displayed in either ID-only mode or not in ID-only mode, wherein when the network diagram is displayed in ID-only mode, the display of each node includes displaying the unique identifier assigned to the task represented by each node and does not include displaying any other task data and wherein when the network diagram is displayed not in ID-only mode, it is displayed with a scaling percentage and the display of each node includes displaying other task data;
    when the network diagram is being displayed in ID-only mode, determining whether a mouse pointer has hovered over a displayed node for more than a threshold amount of time, and when it is determined that the mouse pointer has hovered over the displayed node for more than the threshold amount of time, displaying the node and the task data of the node at a standard magnification with standard formatting, and when the node has been displayed at the standard magnification more than a predetermined amount of time, displaying the node as originally displayed in the network diagram, when the network diagram is being displayed not in ID-only mode but with a scaling percentage that is below a threshold set for node magnification, determining whether a mouse pointer has hovered over a displayed node for more than a threshold amount of time, and when it is determined that the mouse pointer has hovered over the displayed node for more than the threshold amount of time, displaying the node and the task data of the node at a standard magnification with standard formatting, and when the node has been displayed at the standard magnification more than a predetermined amount of time, displaying the node as originally displayed in the network diagram; and when the network diagram is being displayed not in ID-only mode and with a scaling percentage that is not below a threshold set for node magnification, not adjusting the display of any node.

6. The computer-readable medium of claim 5 wherein the threshold set for the scaling percentage is based on whether text of the task data is comprehensible.

7. The computer-readable medium of claim 6 wherein text of the task data is comprehensible when the node and task data is displayed with the increased magnification.

8. The computer-readable medium of claim 5 wherein the node is not displayed with the increased magnification when a node popup feature is not selected.

* * * * *